United States Patent
Jitsukawa et al.

(10) Patent No.: US 10,165,563 B2
(45) Date of Patent: Dec. 25, 2018

(54) BASE STATION, WIRELESS TERMINAL AND WIRELESS COMMUNICATION SYSTEM

(71) Applicant: FUJITSU LIMITED, Kawasaki-shi, Kanagawa (JP)

(72) Inventors: Daisuke Jitsukawa, Adachi (JP); Hiroyuki Seki, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 15/085,723

(22) Filed: Mar. 30, 2016

(65) Prior Publication Data
US 2017/0230967 A1     Aug. 10, 2017

(30) Foreign Application Priority Data
Feb. 5, 2016   (JP) .................. 2016-020995

(51) Int. Cl.
*H04W 72/04*   (2009.01)
*H04W 72/12*   (2009.01)

(52) U.S. Cl.
CPC ..... *H04W 72/0446* (2013.01); *H04W 72/042* (2013.01); *H04W 72/0413* (2013.01); *H04W 72/1273* (2013.01)

(58) Field of Classification Search
CPC ....... H04W 4/00; H04W 72/00; H04W 72/04; H04J 3/00; H04L 47/14
USPC .......................................... 370/329
See application file for complete search history.

(56) References Cited

U.S. PATENT DOCUMENTS

| | | | |
|---|---|---|---|
| 2006/0251030 A1* | 11/2006 | Anderson | H04L 47/14 370/338 |
| 2008/0098400 A1* | 4/2008 | Golitschek Edler Von Elbwart | H04L 47/10 718/104 |
| 2010/0118730 A1* | 5/2010 | Tanaka | H04L 1/0028 370/252 |
| 2013/0034089 A1 | 2/2013 | Nakashima et al. | |

FOREIGN PATENT DOCUMENTS

JP       2011-166570 A     8/2011

* cited by examiner

*Primary Examiner* — Albert T Chou
(74) *Attorney, Agent, or Firm* — Arent Fox LLP

(57) ABSTRACT

A base station includes a scheduler which allocates a first radio resource and a second radio resource while the first radio resource is used to transmit a control channel signal from a wireless terminal, and the second radio resource is used to transmit from the wireless terminal a first reference signal corresponding to the control channel signal even when the wireless terminal does not transmit the control channel signal by using the first radio resource.

17 Claims, 21 Drawing Sheets

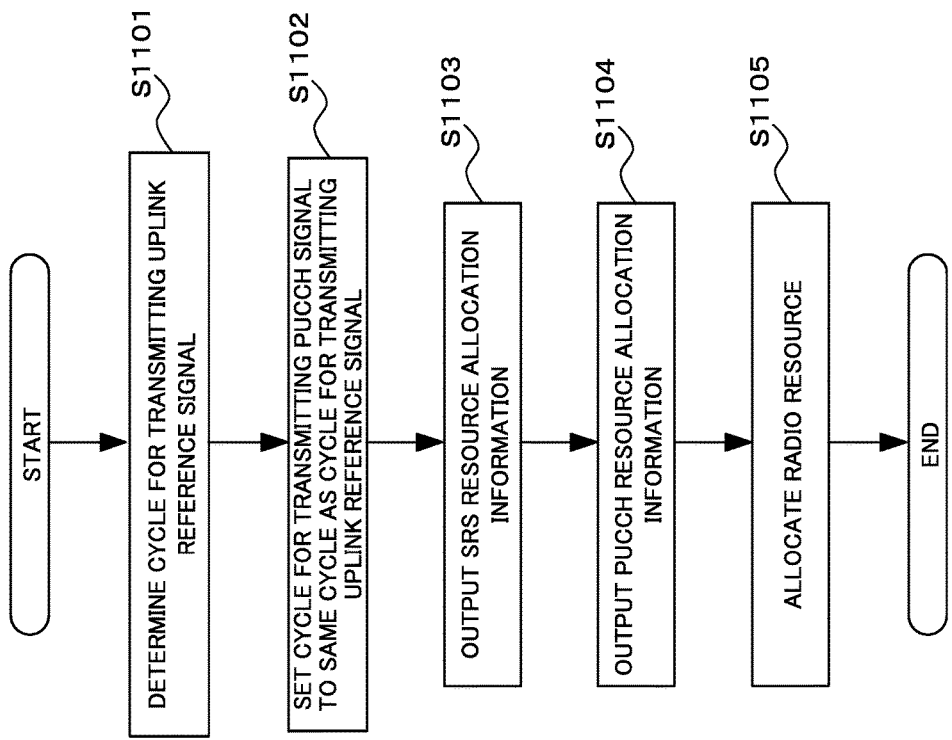

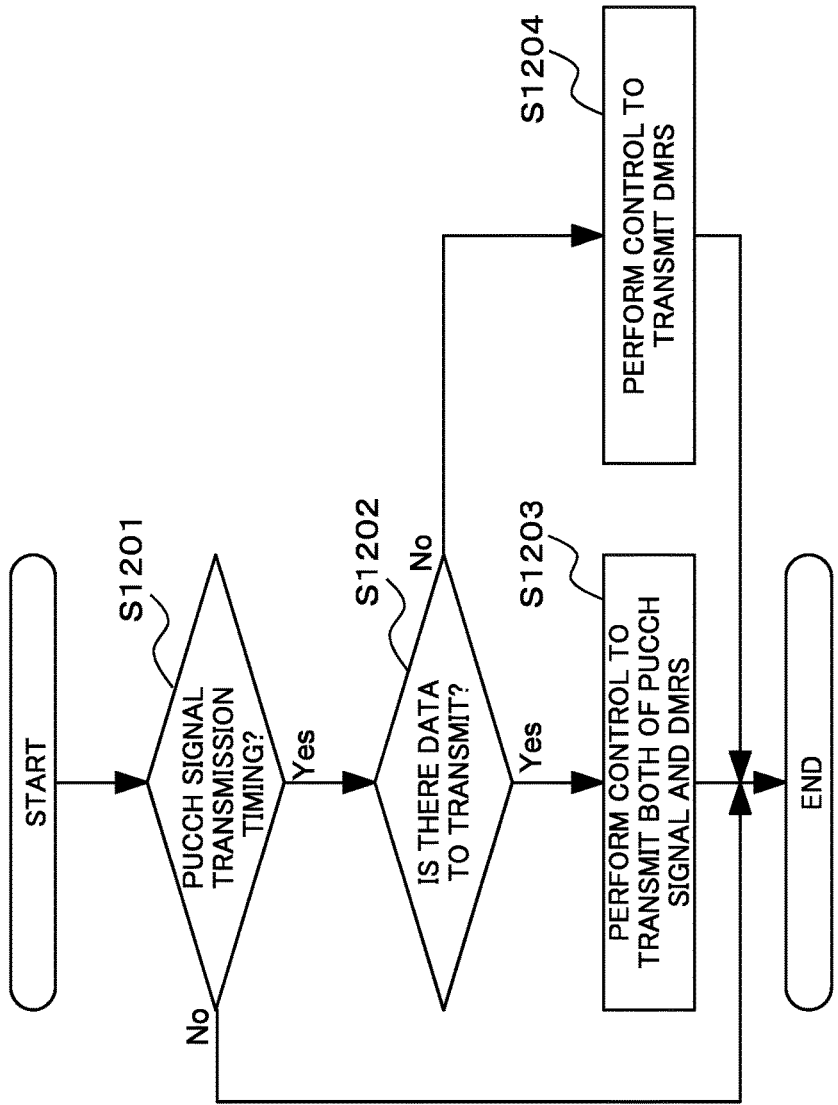

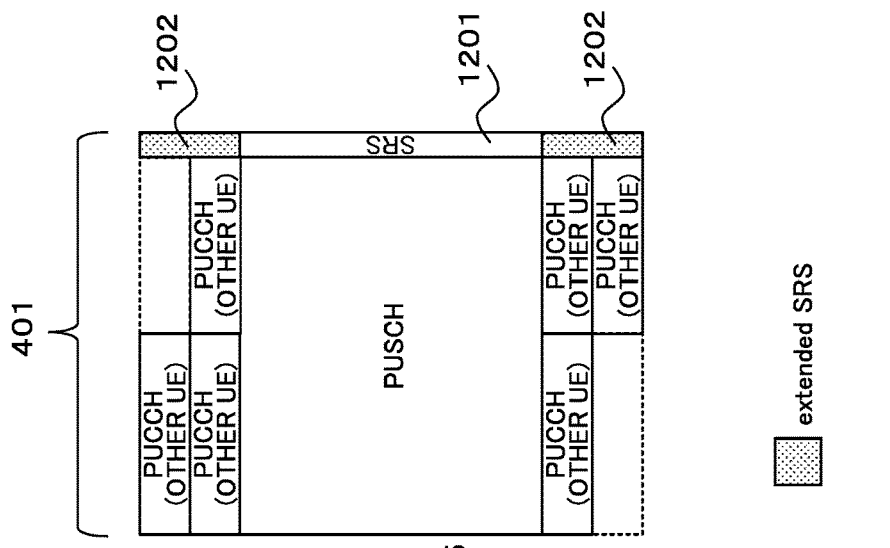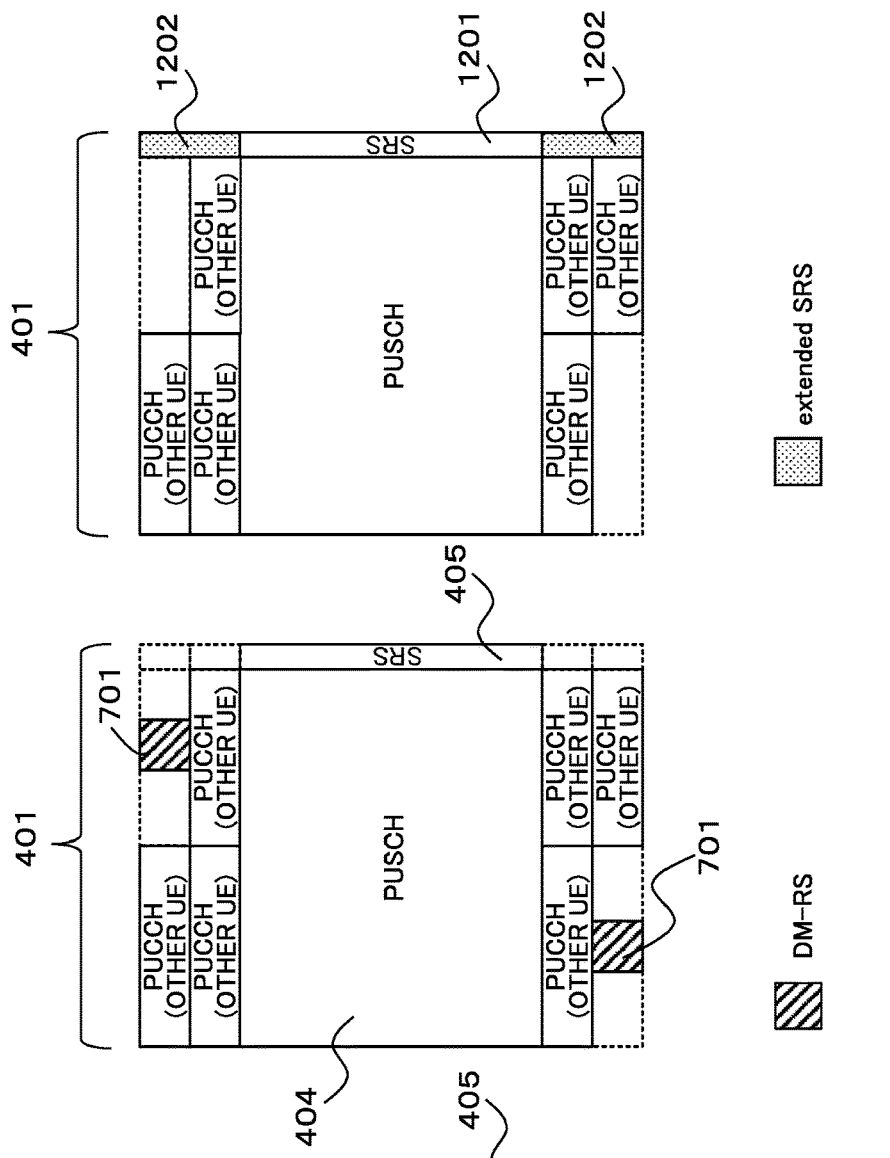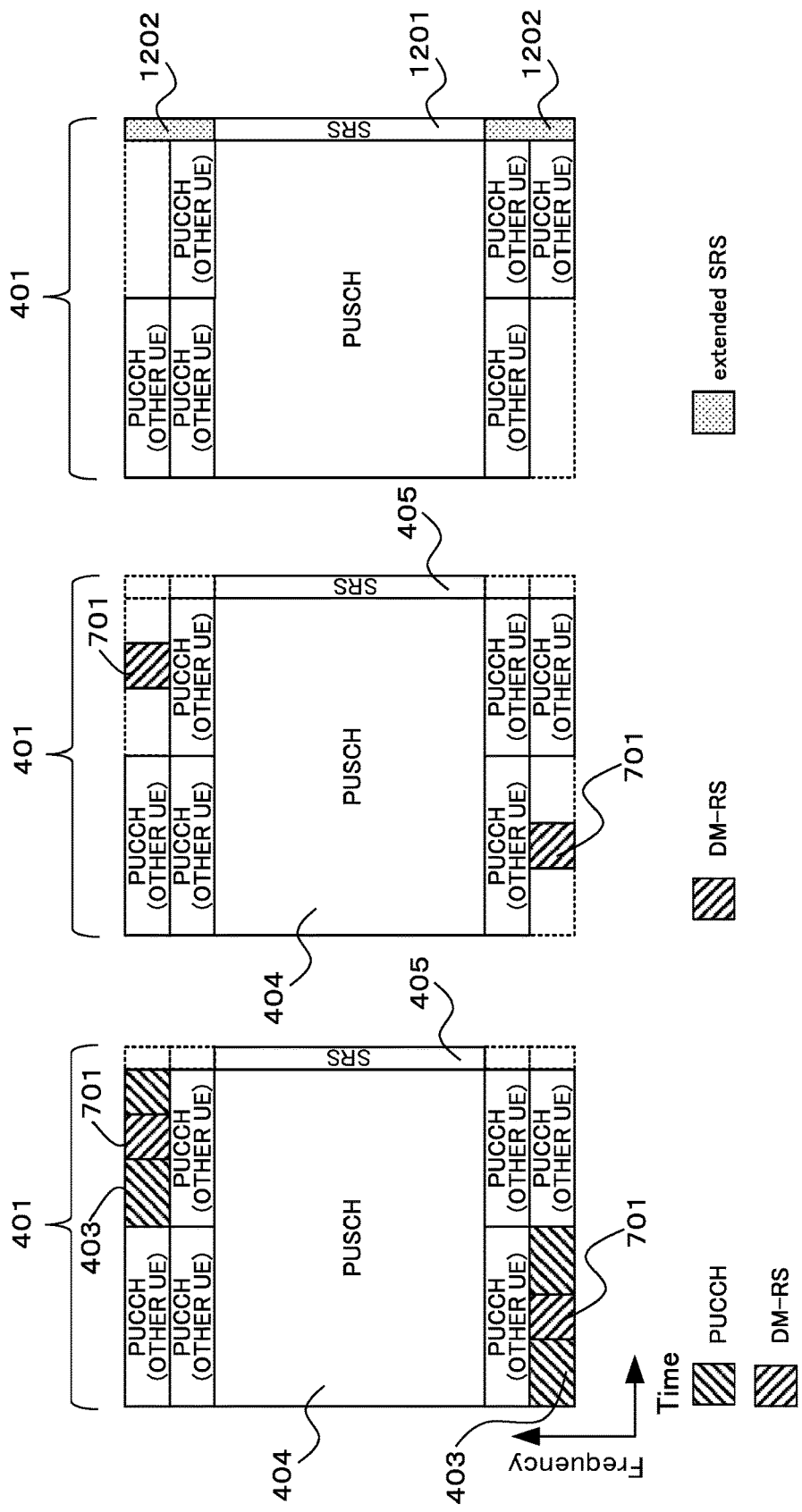

BASE STATION, WIRELESS TERMINAL AND WIRELESS COMMUNICATION SYSTEM

CROSS-REFERENCE TO RELATED APPLICATION

This application is based upon and claims the benefit of priority of the prior Japanese Patent application No. 2016-20995, filed on Feb. 5, 2016, the entire contents of which are incorporated herein by reference.

FIELD

The embodiments discussed herein are related to a base station, a wireless terminal, and a wireless communication system.

BACKGROUND

According to mobile wireless communication, a channel state of a radio link between each base station and each wireless terminal changes according to a time, and differently changes when a frequency is different. Hence, it is necessary to estimate channel states of downlink from each base station to each wireless terminal and uplink from each wireless terminal to each base station.

When each base station and each wireless terminal communicate by way of time-division multiplex, equivalence between uplink and downlink provides equivalent channel states of channels used for uplink and downlink.

[Patent Literature 1] Japanese Laid-open Patent Publication No. 2011-166570.

However, when a channel state is estimated based on an uplink sounding reference signal transmitted by each wireless terminal, a frequency band occupied by the uplink sounding reference signal does not necessarily match an uplink frequency band. In other words, a domain in which resource blocks at both ends of a system bandwidth in which a physical uplink control channel (PUCCH) is arranged are arranged cannot be covered by the uplink sounding reference signal in some cases.

SUMMARY

According to an aspect of the embodiments, a base station that includes a scheduler is provided. The scheduler allocates a first radio resource and a second radio resource. The first radio resource is a radio resource that is used to transmit a control channel signal from a wireless terminal. The second radio resource is used to transmit from the wireless terminal a first reference signal corresponding to the control channel signal even when the wireless terminal does not transmit the control channel signal by using the first radio resource.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 11 is a flowchart for explaining an operation of the base station according to the first embodiment;

FIG. 12 is a flowchart for explaining an operation of the wireless terminal according to the first embodiment;

FIG. 13A is a view illustrating an example where radio resources (the first radio resource and the third radio resources) of the uplink channel are allocated to the wireless terminal according to the first embodiment;

FIG. 13B is a view illustrating an example where radio resources (the second radio resource and the third radio resource) of the uplink channel are allocated to the wireless terminal according to the first embodiment;

FIG. 13C is a view illustrating an example where a radio resource (a fourth radio resource) of the uplink channel is allocated to the wireless terminal according to the first embodiment;

DESCRIPTION OF EMBODIMENTS

Figure 1:
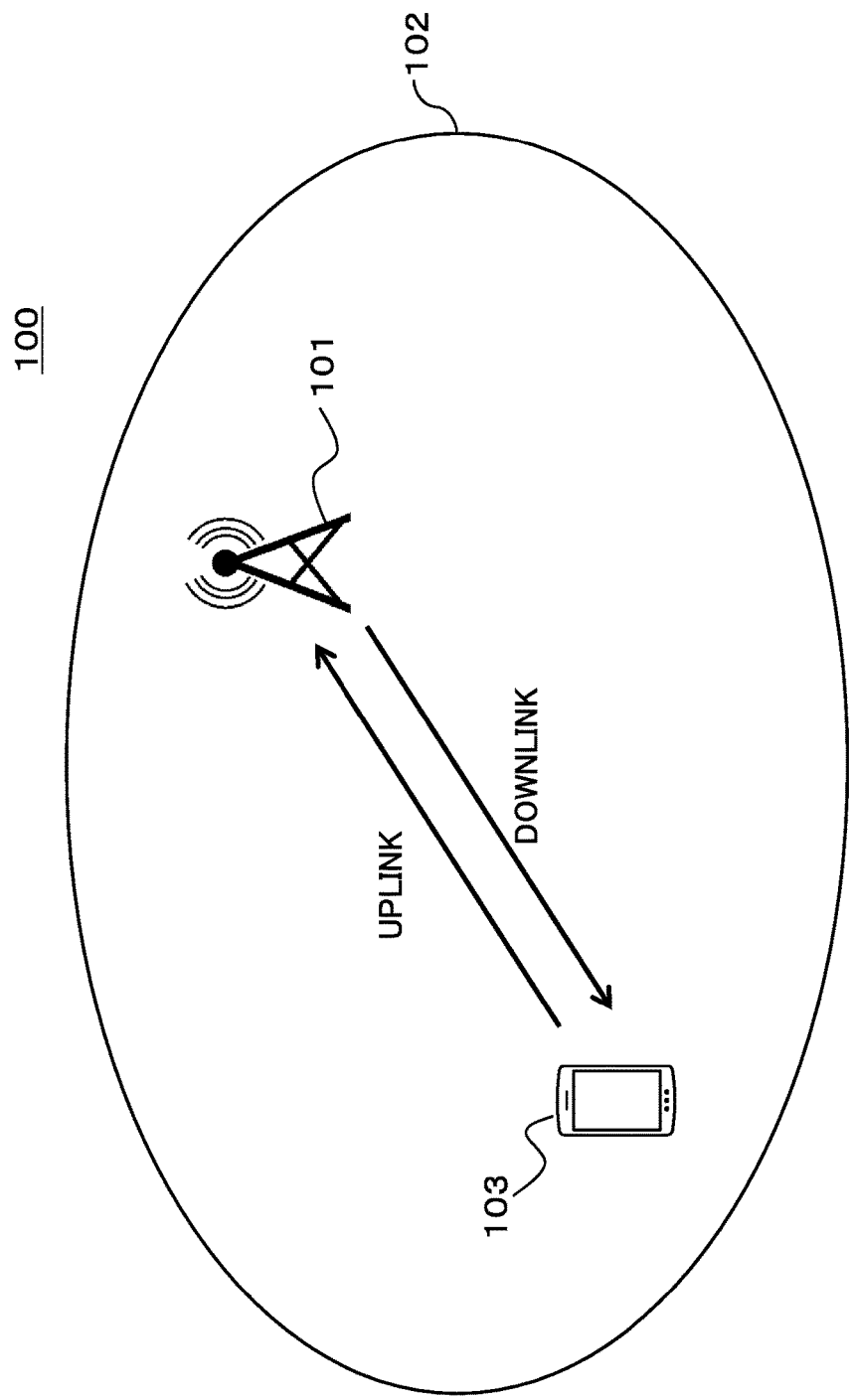
FIG. 1 is an overall view of a wireless communication system related to related art.

Embodiments for carrying out the invention will be described below with reference to the drawings. In addition, the same components will be assigned the same reference numerals and will not be described depending on cases.

(Related Art)

FIG. 1 is an overall view of a wireless communication system 100 according to related art. A base station 101 forms a wireless area 102. When a wireless terminal 103 is in the wireless area 102, the base station 101 and the wireless terminal 103 can communicate with each other via a radio link.

The base station 101 may be variously referred to as a "Node-B", an "evolved Node-B (eNB)" and a "remote radio head (RRH)."

The wireless terminal 103 may be variously referred to as "user equipment (UE)", a "mobile station (MS)", a "user terminal" and a "subscriber station."

Among radio links used by the base station 101 and the wireless terminal 103 for communication, a link in a direction from the base station 101 to the wireless terminal 103 will be referred to as "downlink", and a link in a direction from the wireless terminal 103 to the base station 101 will be referred to as "uplink."

Figure 2:
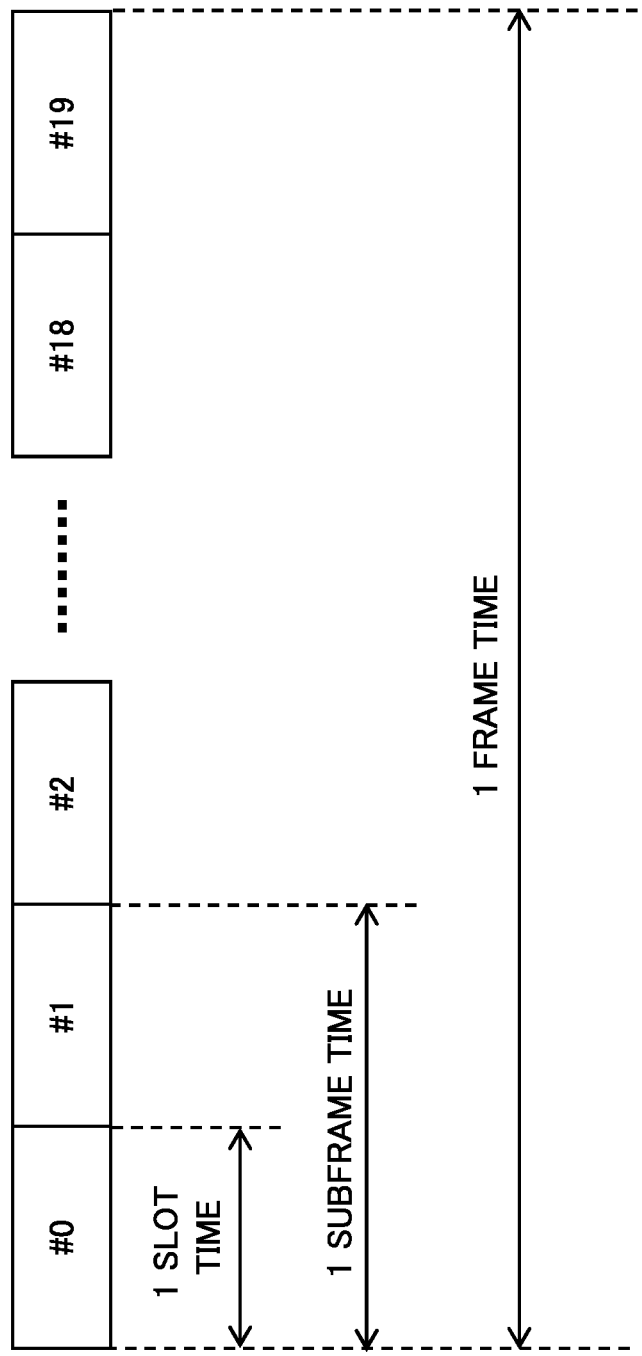
FIG. 2 is a view illustrating an example of a relationship between a frame, a subframe and a slot according to the related art.

FIG. 2 is a view illustrating an example of a relationship between a "frame", a "subframe" and a "slot" for communication between the base station 101 and the wireless terminal 103. The frame is a radio resource allocation unit. One frame time is a multiple of one slot time which is a predetermined number. In FIG. 2, one frame time is 20 times as one slot time. In other words, 20 slots configure one frame in FIG. 2. Further, two time-continuous slots configure one subframe. Hence, in FIG. 2, 10 subframes configure one frame. In addition, how many subframes configure one frame and how many slots configure one subframe can be determined arbitrarily.

Figure 3:
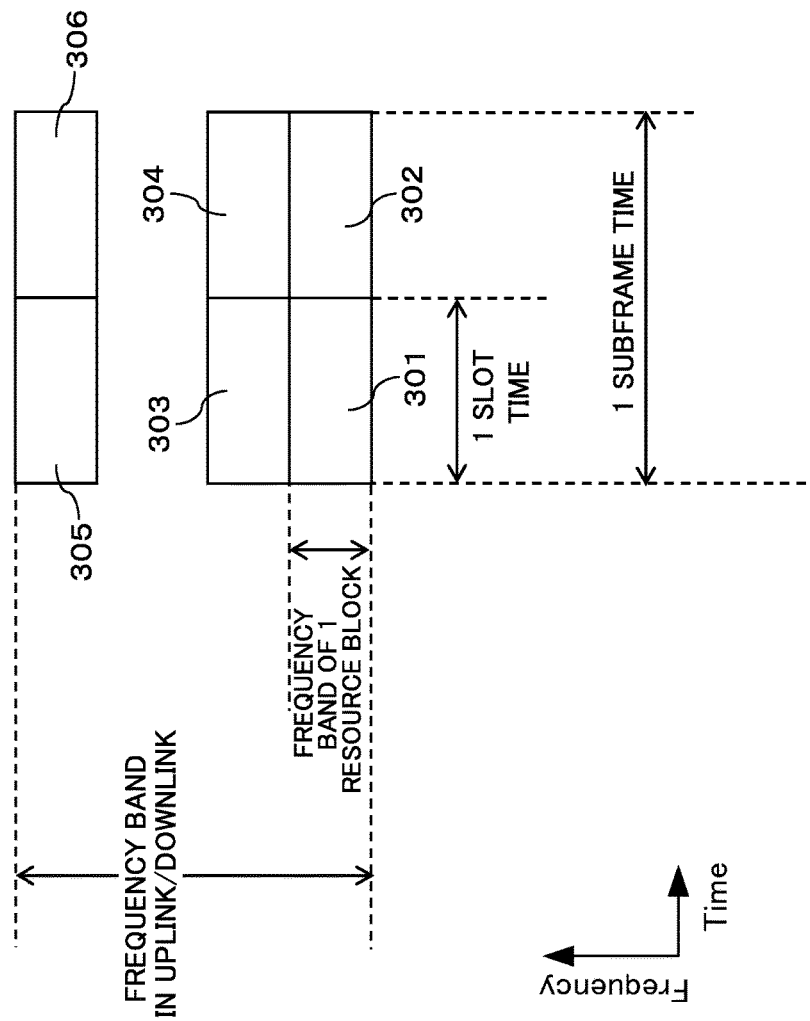
FIG. 3 is a view illustrating an example of an arrangement of resource blocks in uplink and downlink according to the related art.

FIG. 3 is a view illustrating an example of an arrangement of "resource blocks" in uplink and downlink. Resource blocks 301, 302, 303, 304, 305 and 306 are configured by arranging a plurality of slots in a frequency domain. One resource block 301 occupies one slot time and can be configured by, for example, frequency bandwidths of 12 subcarries. In other words, the 12 subcarries configure one resource block frequency band.

The resource blocks 301, 303 and 305 are arranged in the frequency domain to configure uplink and downlink frequency bands. For example, the uplink and downlink frequency bands including a bandwidth of 20 MHz are configured by arranging 100 resource blocks in the frequency domain.

Figure 4:
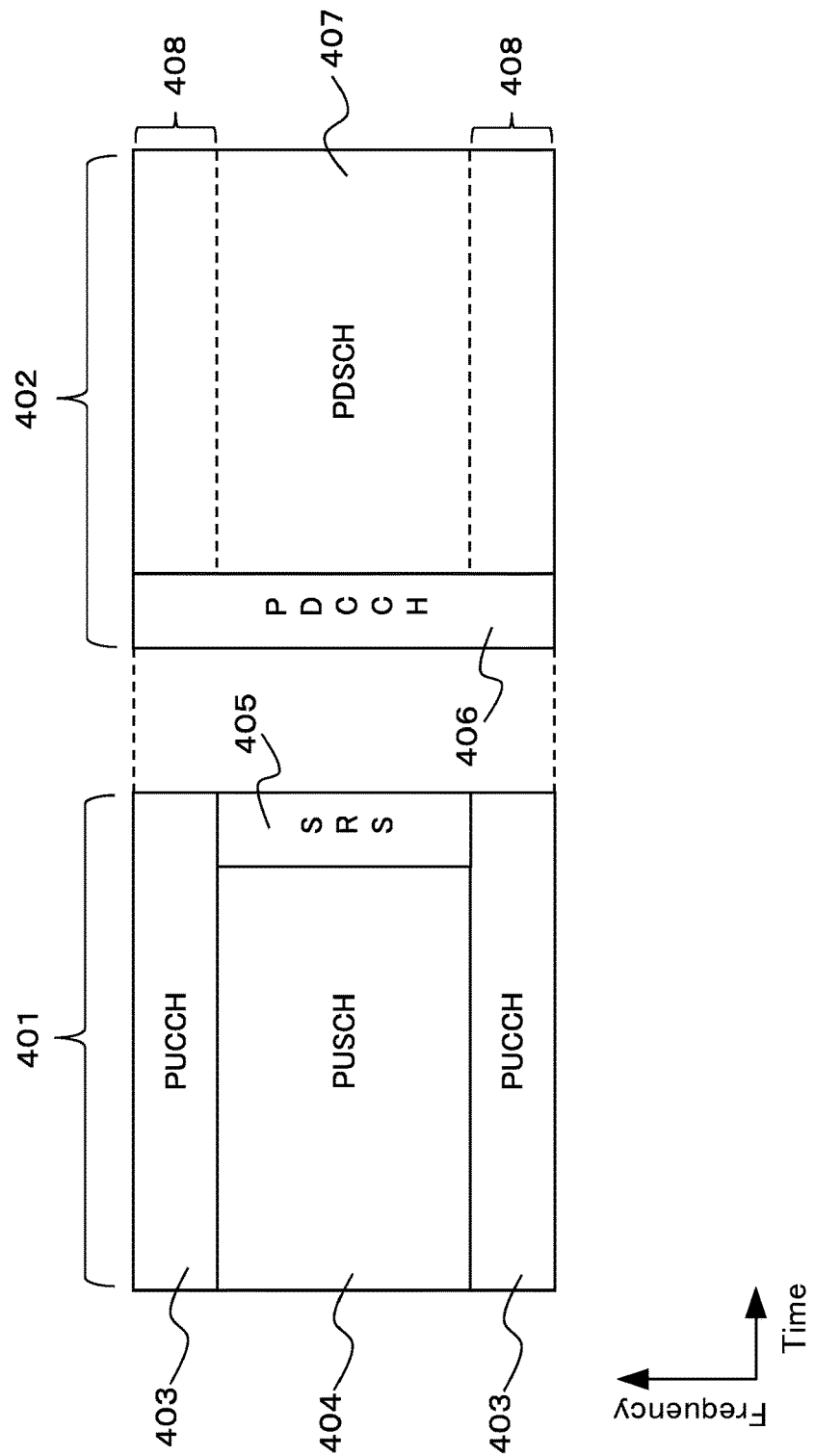
FIG. 4 is a view illustrating an example of an arrangement of an uplink signal and a downlink signal according to the related art.

FIG. 4 is a view illustrating an arrangement of signals in uplink and downlink. In an uplink subframe 401, a PUCCH signal 403, a PUSCH (Physical Uplink Shared CHannel) signal 404 and a SRS (Sounding Reference Signal) 405 are arranged. In addition, the PUCCH signal 403 is a channel through which the wireless terminal 103 transmits an uplink control channel signal. The PUSCH 404 is a channel through which the wireless terminal 103 transmits an uplink shared channel signal (data channel signal). The SRS 405 is an example of a reference signal for a radio link through which the wireless terminal 103 transmits to allow the base station 101 to estimate an uplink channel state. Further, the SRS 405 is transmitted by using the same band as a band of the uplink shared channel and can be used to estimate a channel state of the uplink shared channel, and therefore will be also referred to as "a reference signal corresponding to an uplink data channel signal."

In a first embodiment described below, the PUCCH signal 403 may be transmitted to request an allocation of a radio channel to uplink from the wireless terminal 103 to the base station 101 (scheduling request) or may be transmitted for HARQ-Ack (Hybrid Automatic reQuest Acknowledge). Further, as described in a second embodiment below, the PUCCH signal 403 may be used to transmit a CSI (Channel State Information) report from the wireless terminal 103 to the base station 101.

In a downlink subframe 402, a PDCCH (Physical Downlink Control CHannel) signal 406 and a PDSCH (Physical Downlink Shared CHannel) signal 407 are arranged. The PDCCH 406 is a channel for transmitting a downlink control channel signal. For example, the PDCCH 406 is used to notify an allocation of radio resources to the wireless terminal 103 from the base station 101. The PDSCH 407 is a channel for transmitting a downlink shared channel signal. For example, the PDSCH 407 is used to transmit user data from the base station 101 to the wireless terminal 103.

When the base station 101 and the wireless terminal 103 communicate by way of time-division multiplex, frequency bands occupied by the uplink subframe 401 and the downlink subframe 402 are the same. Consequently, that the base station 101 estimates an uplink channel state by using the SRS 405 is substantially equivalent to that the base station 101 estimates a downlink channel state.

However, a frequency band of the SRS 405 which is an example of a reference signal for a radio link does not necessarily occupy both ends of a frequency band occupied by the uplink subframe 401. Hence, even when a channel state is estimated by using the SRS 405, it is difficult to estimate states of frequency bands 408 of uplink and downlink. This is because the SRS 405 is used to schedule a PUSCH and determine a modulation coding method, and the SRS 405 covers a resource block used to transmit the PUSCH. Hence, the SRS 405 does not necessarily cover frequency bands of resource blocks at both ends of uplink in which the PUCCH signals 403 are arranged. When, for example, an uplink bandwidth is 20 MHz, the SRS 405 may be transmitted to cover 96 resource blocks among 100 resource blocks at maximum. This is because a bandwidth and a frequency hopping are set for a resource block in which the SRS 405 is arranged, based on a control signal of an upper layer.

Hence, the base station 101 tries to estimate a channel state by using a CSI report which indicates a downlink state and is fed back from the wireless terminal 103 or by using a downlink state of a neighboring resource block. However, it is difficult or impossible to accurately estimate a channel state of resource block portions at both ends of a radio link.

(First Embodiment)

A first embodiment where a cycle (first cycle) for transmitting an uplink control channel signal is associated with a cycle (second cycle) for transmitting a reference signal corresponding to an uplink data channel signal will be described. Associating the first cycle with the second cycle means allocating to a wireless terminal 103 a radio resource for transmitting a reference signal corresponding to an uplink data channel signal when a control channel signal is transmitted at the first cycle. Alternatively, associating the first cycle with the second cycle means allocating to the wireless terminal 103 a radio resource whose lengths of first cycle and second cycle are the same. In other words, the length of the first cycle is one time as the length of the second cycle. More specifically, a radio resource for transmitting an uplink control channel signal and a reference signal corresponding to an uplink data channel signal by using the same subframe is allocated to the wireless terminal 103.

According to the present embodiment, a base station 101 can estimate a channel state of an uplink control channel based on a reference signal (referred to as a "first reference signal" below) corresponding to an uplink control channel signal. Further, the base station 101 can estimate a channel state of an uplink data channel based on a reference signal (referred to as a "second reference signal" below) corresponding to an uplink data channel signal and, consequently, can more accurately estimate an uplink channel state. Furthermore, when the base station 101 and the wireless terminal 103 communicate by way of time-division multiplex, equivalence between uplink and downlink enables accurate estimation of a downlink channel state.

In addition, allocating a radio resource to a wireless terminal means that the wireless terminal 103 has a chance to use one or both of a frequency resource and a time resource of the allocated radio resource. Hence, the wireless terminal 103 does not always transmit a signal by using a radio resource. When, for example, a radio resource for transmitting an uplink control channel signal is allocated to the wireless terminal 103, if the wireless terminal 103 does not have a uplink control channel signal to transmit, the wireless terminal 103 does not transmit the uplink control channel signal or transmits only the first reference signal. In other words, the wireless terminal 103 does not transmit the uplink control channel signal by using one or both of a frequency and a time specified by the radio resource, or transmits only the first reference signal. However, it is preferred that the wireless terminal 103 transmits the second reference signal for channel estimation.

Further, a "radio resource" simply described means one or both of a "frequency resource" and a "time resource" for wireless communication. Which one of the frequency resource and the time resource the radio resource means can be determined based on a context in which the "radio resource" is used.

Figure 5:
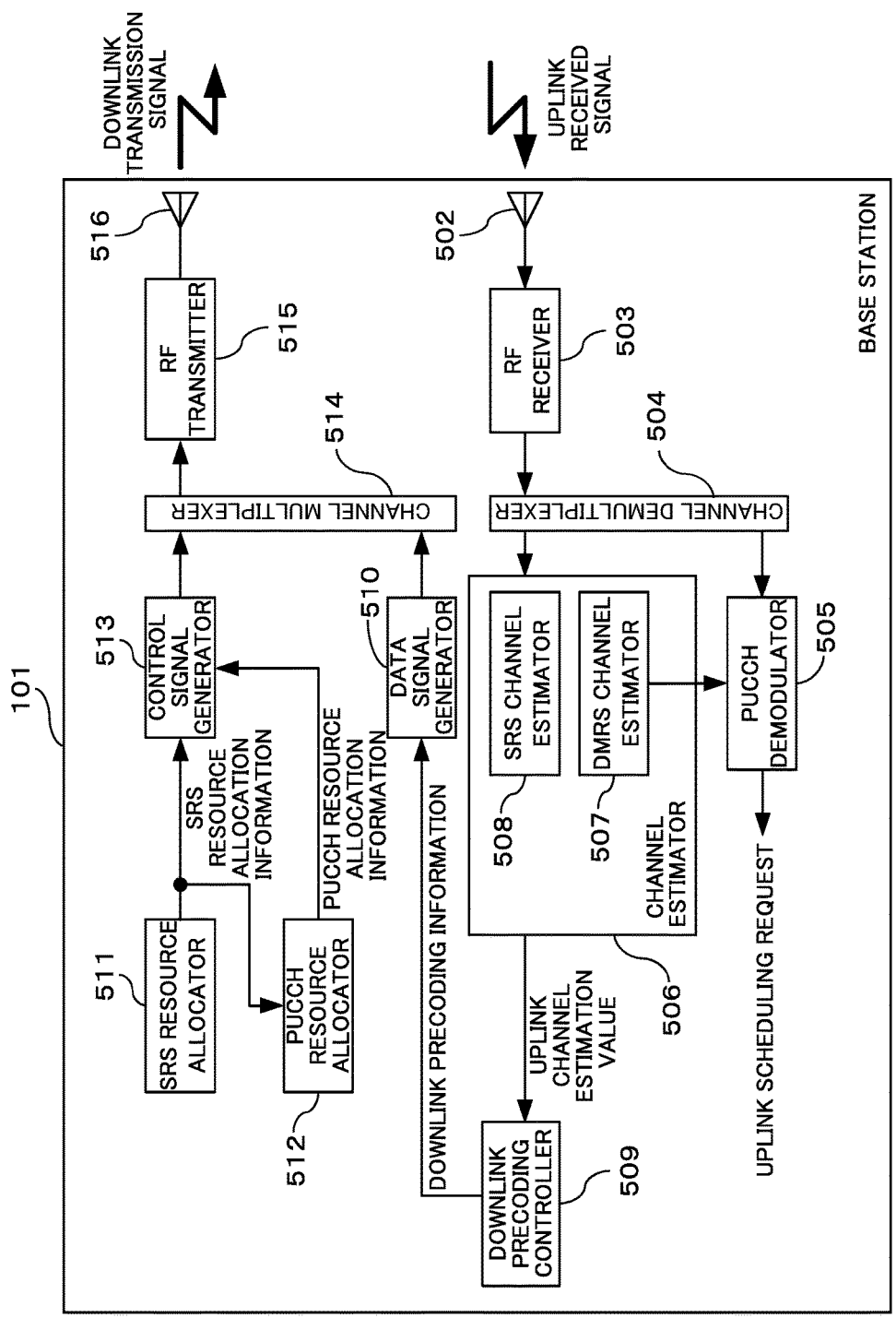
FIG. 5 is a functional block diagram of a base station according to a first embodiment.

FIG. 5 is a functional block diagram of the base station 101 according to one embodiment. The base station 101 includes a reception antenna 502, an RF (Radio Frequency) receiver 503, a channel demultiplexer 504, a PUCCH demodulator 505, a channel estimator 506 and a downlink precoding controller 509. Further, the base station 101 includes a data signal generator 510, an SRS resource allocator 511, a PUCCH resource allocator 512, a control signal generator 513, a channel multiplexer 514, a RF transmitter 515 and a transmission antenna 516.

The reception antenna 502 receives a radio signal from the wireless terminal 103, generates an uplink signal and outputs the uplink signal to the RF receiver 503.

The RF receiver 503 down-converts a frequency of the uplink signal and digitally converts the uplink signal, generates a baseband signal and outputs the baseband signal to the channel demultiplexer 504. In addition, the RF receiver 503 will be also referred to as an "uplink receiver" or simply as a "receiver."

The channel demultiplexer 504 demultiplexes a PUCCH signal, a PUSCH signal, a first reference signal and a second reference signal included in the baseband signal. The PUCCH signal of the demultiplexed signals is output to the PUCCH demodulator 505. Further, the PUSCH signal is output to a PUSCH demodulator which is not illustrated. The first reference signal and the second reference signal included in the baseband signal are output to the channel estimator 506. The signal output to the PUCCH demodulator 505 is used for an uplink scheduling request, for example.

In addition, the first reference signal also is used as a reference signal (DMRS (DeModulation Reference Signal)), for demodulating a PUCCH signal 403, and therefore will be also referred to as a DMRS.

The channel estimator 506 includes a DMRS channel estimator 507 and an SRS channel estimator 508. The DMRS channel estimator 507 outputs the first reference signal. The DMRS channel estimator 507 outputs the DMRS for demodulating the PUCCH signal 403 to the PUCCH demodulator 505. Further, the DMRS channel estimator 507 estimates a channel state of a frequency band of a PUCCH of an uplink channel by using the first reference signal. In addition, in the present embodiment, the wireless terminal 103 does not transmit a PUCCH signal in some cases, and, even in this case, channel estimation for a PUCCH is performed when there is a first reference signal.

The SRS channel estimator 508 receives the second reference signal. The SRS channel estimator 508 performs channel estimation on a portion of an uplink frequency band at which the second reference signal is arranged, by using the second reference signal.

In addition, a frequency bandwidth occupied by the first reference signal and the second reference signal may be an uplink frequency bandwidth. In other words, a frequency resource of the first reference signal may be different from a frequency resource of the second reference signal. Thus, the frequency band of the first reference signal is added to the frequency band of the second reference signal, so that the frequency band becomes wider and it is possible to more accurately estimate a channel state. In addition, the frequency bandwidth is a difference between a maximum frequency of the frequency band and a minimum frequency of the frequency band.

The channel estimator 506 outputs estimation results of the DMRS channel estimator 507 and the SRS channel estimator 508 to the downlink precoding controller 509. The estimation results of the DMRS channel estimator 507 and the SRS channel estimator 508 output from the channel estimator to the downlink precoding controller 509 will be also referred to as a "uplink channel estimation value."

According to time-division multiplex communication, an uplink channel estimation value can be used for an estimation value of a downlink channel state. Hence, the downlink precoding controller 509 controls precoding to be applied to a downlink baseband signal based on the uplink channel estimation value output from the channel estimator 506. In other words, the downlink precoding controller 509 calculates information related to a downlink transmission format such as a precoding matrix based on the channel estimation value of the channel estimator 506. The information related to the downlink transmission format calculated by the downlink precoding controller 509 will be also referred to as "precoding information." Hence, the downlink precoding controller 509 outputs precoding information to the data signal generator.

Further, the base station 101 performs scheduling for allocating a radio resource for transmitting a PUSCH signal from the wireless terminal 103, based on an uplink channel estimation value, and may notify the allocation of the radio resource by using the PDCCH.

The data signal generator 510 precodes a downlink baseband signal by using the downlink precoding information, and outputs the downlink baseband signal to the channel multiplexer 514.

The SRS resource allocator 511 allocates a radio resource for transmitting the second reference signal from the wireless terminal 103 to the base station 101. In other words, the SRS resource allocator 511 determines a cycle (interval) at which the wireless terminal 103 transmits the second reference signal to the base station 101. Next, the SRS resource allocator 511 allocates the radio resource to the wireless terminal 103 to transmit the second reference signal at the determined cycle. A radio resource allocation result is output to the PUCCH resource allocator 512 and the control signal generator 513. The radio resource allocation result will be also referred to as "SRS resource allocation information." In addition, a radio resource may be allocated to the wireless terminal 103 based on the uplink channel estimation value to transmit the second reference signal. By allocating the radio resource based on the uplink channel estimation value, it is possible to increase, for example, wireless communication efficiency.

The PUCCH resource allocator 512 allocates a radio resource for transmitting a PUCCH signal from the wireless terminal 103 to the base station 101 based on the SRS resource allocation information. More specifically, the PUCCH resource allocator 512 determines a cycle at which the wireless terminal 103 transmits the PUCCH signal to the base station 101. In this case, the PUCCH resource allocator 512 associates a cycle at which the wireless terminal 103 transmits the PUCCH signal, with a cycle at which the wireless terminal 103 transmits the second reference signal. As a result, the PUCCH resource allocator 512 allocates a second radio resource and outputs the second radio resource to the control signal generator 513.

For example, the PUCCH resource allocator 512 allocates a frequency resource for a PUCCH format 1, to a subframe for transmitting the second reference signal. Alternatively, the PUCCH resource allocator 512 may allocate a frequency resource for one of PUCCH formats 1a/1b/3, to the subframe for transmitting the second reference signal.

In addition, the radio resource allocation result will be also referred to as "PUCCH resource allocation information." Further, the SRS resource allocator 511 and the PUCCH resource allocator 512 will be also referred to as a "scheduler" collectively. Consequently, the scheduler can allocate the radio resources to the wireless terminal 103.

In other words, in the present embodiment, the scheduler allocates a first radio resource for transmitting a PUCCH signal from the wireless terminal 103. Further, the scheduler allocates the second resource for transmitting the first reference signal even when the wireless terminal 103 does not transmit the PUCCH signal by using the first radio resource. The first radio resource and the second radio resource are radio resources corresponding to PUCCH resource allocation information. Further, a radio resource corresponding to the SRS resource allocation information will be referred to as a third radio resource. In other words, the third radio resource is a radio resource for transmitting the second reference signal from the wireless terminal 103.

Figure 6:
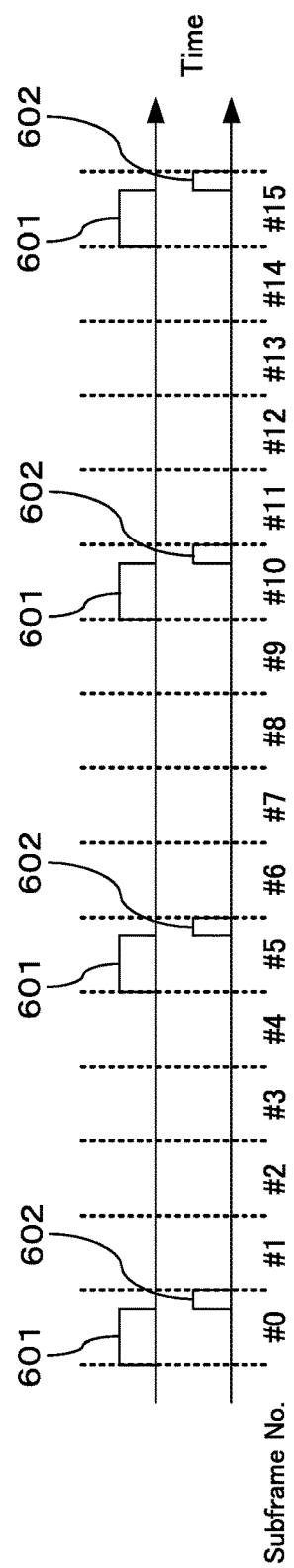
FIG. 6 is a view illustrating an example where a cycle for transmitting a reference signal corresponding to an uplink control channel is associated with a cycle for transmitting a second reference signal.

FIG. 6 is a view illustrating an example where the cycle at which the wireless terminal 103 transmits a PUCCH signal is associated with the cycle at which the wireless terminal 103 transmits the second reference signal. A horizontal axis is a time axis. The SRS resource allocator 511 allocates a radio resource (third radio resource) to enable the wireless terminal 103 to transmit second reference signals 602 by using subframes #0, 5, 10 and #15. Further, the PUCCH resource allocator 512 allocates the radio resource (first radio resource) to enable the wireless terminal 103 to transmit PUCCH signals 601 by using the subframes #0, #5, #10 and #15.

In addition, FIG. 6 illustrates that the second reference signals 602 and the PUCCH signals 601 are transmitted at equal intervals of five subframe intervals (equal intervals). However, subframes for transmitting the second reference signals 602 and the PUCCH signals 601 do not need to be transmitted at equal intervals. For example, subframe intervals may be intervals of prime numbers such as two, three, five, seven and eleven, and the second reference signals 602 and the PUCCH signals 601 may be transmitted by using subframes whose intervals are not equal.

As described above, when the base station 101 receives each second reference signal 602 from the wireless terminal 103, the base station 101 can receive the first reference signal transmitted together with each PUCCH signal 601 by using the same subframe or a preceding or subsequent subframe, in other words, in a close or a same timing. Consequently, the base station 101 can more accurately estimate a channel state. Particularly, as illustrated in FIG. 6, when the wireless terminal 103 transmits the first reference signal which can be transmitted together with each second reference signal 602 and each PUCCH signal 601 by using the same subframe, the base station 101 can more accurately perform channel estimation.

Figure 7:
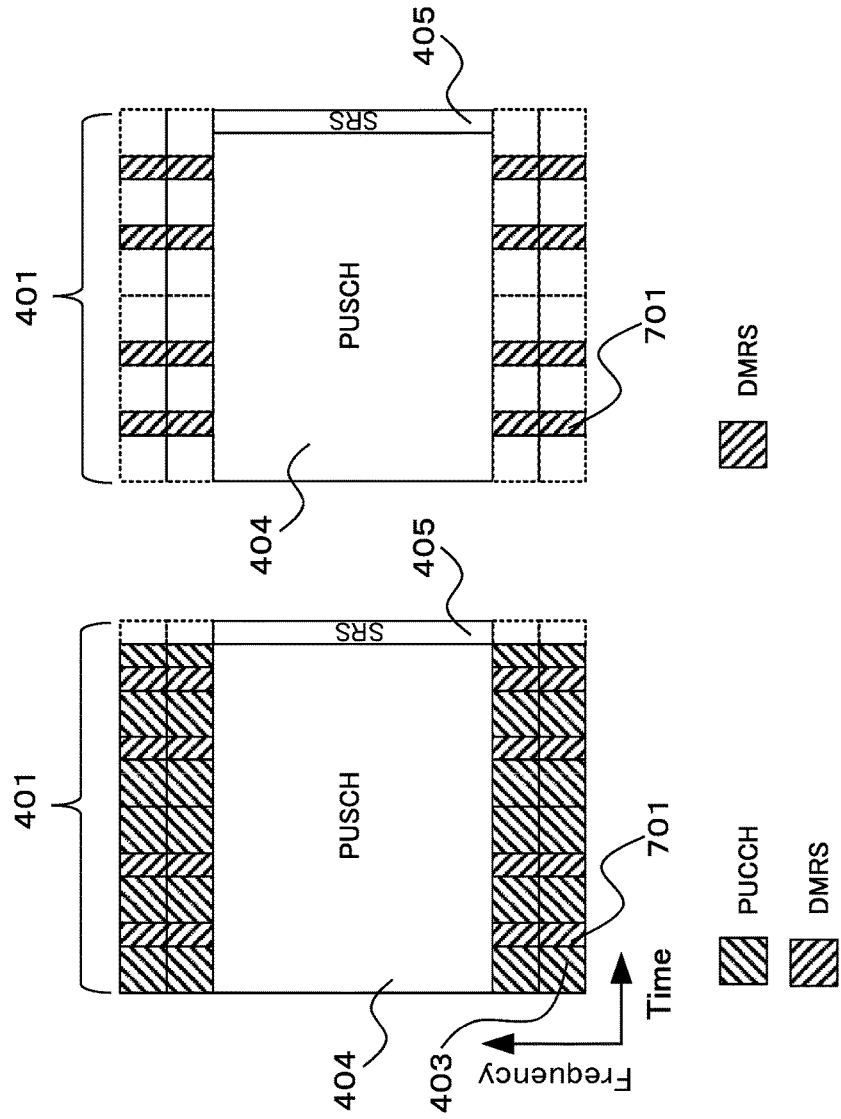
FIG. 7A is a view illustrating an example where radio resources (a first radio resource and a third radio resource) of an uplink channel is allocated to a wireless terminal according to the first embodiment.
FIG. 7B is a view illustrating an example where radio resources (a second radio resource and the third radio resource) of the uplink channel are allocated to the wireless terminal according to the first embodiment.

In addition, the first reference signal, which may be transmitted together with each PUCCH signal 601, may include a signal for demodulating a PUCCH signal. Hence, as illustrated in FIG. 7A, when the wireless terminal 103 has the PUCCH signal 403 to transmit, the wireless terminal 103 include the PUCCH signal 403 and a first reference signal 701 in a subframe 401 to transmit. Further, even when the wireless terminal 103 does not have a PUCCH signal to transmit, the wireless terminal 103 may preferably transmit the first reference signal 701 of a PUCCH at the same cycle as a cycle for transmitting a second reference signal 405. In other words, in one embodiment, as illustrated in FIG. 7B, the wireless terminal 103 may transmit the first reference signal by using a radio resource for transmitting a PUCCH signal without transmitting PUCCH signal. Consequently, when the second reference signal 405 is transmitted by using a given subframe, the first reference signal 701 is transmitted by using this subframe, so that it is possible to more accurately perform channel estimation.

Transmitting the first reference signal as described above is useful when the wireless terminal 103 requests an uplink radio resource and includes in a PUCCH signal a signal indicating this request to transmit. The uplink radio resource request is not always made even when a radio resource for transmitting a PUCCH signal is allocated. Even when the wireless terminal 103 does not need to request an uplink radio resource, the wireless terminal 103 transmits the first reference signal 701, so that it is possible to set to the same cycle the cycle at which the wireless terminal transmits the second reference signal and the cycle for transmitting the first cycle. Further, the same applies to that acknowledgement of Hybrid Automatic Request can be included in the PUCCH signal.

The control signal generator 513 generates a signal indicating a radio resource, based on the SRS resource allocation information output from the SRS resource allocator 511 and the PUCCH resource allocation information output from the PUCCH resource allocator 512. The signal indicating the generated radio resource is output to the channel multiplexer 514.

The channel multiplexer 514 multiplexes the control signal generated by the control signal generator 513 and the data signal generated by the data signal generator 510, generates a baseband signal and outputs the baseband signal to the RF transmitter 515.

The RF transmitter 515 converts the baseband signal output from the channel multiplexer 514 into an analog signal, up-converts the frequency, generates a downlink signal and outputs the downlink signal to the transmission antenna 516. The RF transmitter 515 will be also referred to as a "downlink transmitter" or simply as a "transmitter."

The transmission antenna 516 transmits to the wireless terminal 103 a radio signal corresponding to the downlink signal output from the RF transmitter 515.

Figure 8:
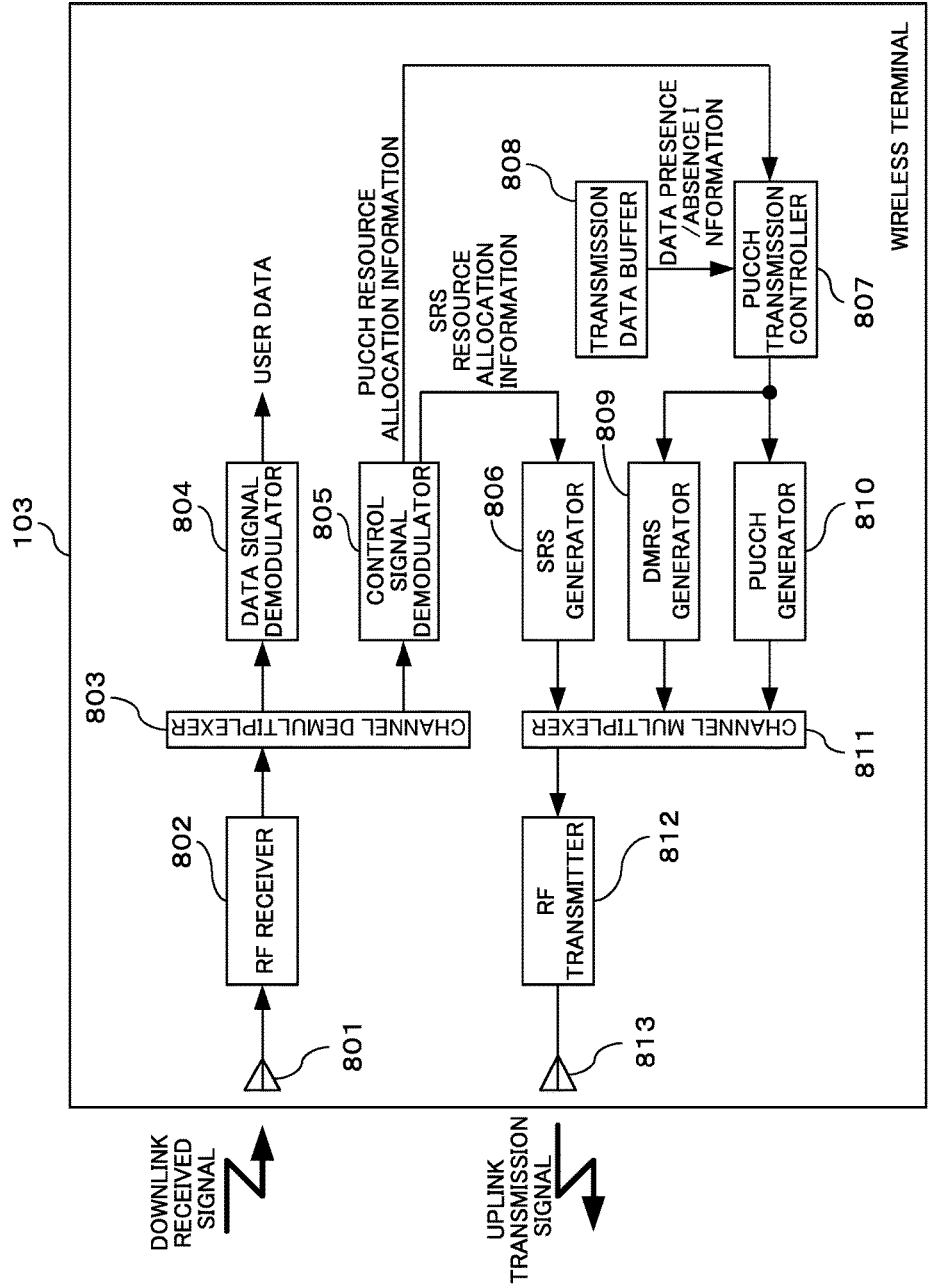
FIG. 8 is a functional block diagram of the wireless terminal according to the first embodiment.

FIG. 8 is a functional block diagram of the wireless terminal 103 according to the present embodiment. The wireless terminal 103 includes a reception antenna 801, an RF receiver 802, a channel demultiplexer 803, a data signal demodulator 804, a control signal demodulator 805, an SRS generator 806, a PUCCH transmission controller 807 and a transmission data buffer 808. Further, the wireless terminal 103 includes a DMRS generator 809, a PUCCH generator 810, a channel multiplexer 811, an RF transmitter 812 and a transmission antenna 813.

The reception antenna 801 receives a radio signal, generates a downlink signal and outputs the downlink signal to the RF receiver 802.

The RF receiver 802 down-converts a frequency of a downlink signal and digitally converts the downlink signal, generates a baseband signal and outputs the baseband signal to the channel demultiplexer 803. The RF receiver 802 will be also referred to as a "downlink receiver" or simply as a "receiver."

The channel demultiplexer 803 demultiplexes a PDCCH signal and a PDSCH signal included in the baseband signal. Further, the channel demultiplexer 803 outputs the PDCCH signal of the demultiplexed signals to the control signal demodulator 805, and outputs the PDSCH signal to the data signal demodulator 804.

The data signal demodulator 804 demodulates the PDSCH signal output from the channel demultiplexer 803, generates user data and outputs the user data.

The control signal demodulator 805 demodulates the PDCCH signal output from the channel demultiplexer 803. The PDCCH signal includes a signal indicating a radio resource allocated from the base station 101 to the wireless terminal 103. By processing this signal, it is possible to obtain SRS resource allocation information indicating a radio resource for transmitting the second reference signal, and PUCCH resource allocation information for transmitting the PUCCH signal. The control signal demodulator 805 outputs the SRS resource allocation information to the SRS generator 806, and outputs the PUCCH resource allocation information to the PUCCH transmission controller 807.

In addition, a cycle is set as described below based on output of the SRS resource allocation information and the PUCCH resource allocation information, and therefore the control signal demodulator 805 will be also referred to as a "setter."

The SRS generator 806 generates the second reference signal according to the SRS resource allocation information output from the control signal demodulator 805. Consequently, the SRS generator 806 can generate the second reference signal at a cycle at which the SRS resource allocator 511 in FIG. 5 has determined an allocation, and output the second reference signal to the channel multiplexer 811. In other words, the SRS generator 806 can generate the second reference signal by using the third radio resource.

The PUCCH transmission controller 807 controls transmission of the PUCCH signal according to the PUCCH resource allocation information output from the control signal demodulator 805. The PUCCH transmission controller 807 obtains information as to whether or not there is data such as user data transmitted by using the PUSCH from the transmission data buffer 808 to a transmission buffer, which is not illustrated. The transmission buffer is a buffer which temporarily buffers data before the data is transmitted to the base station 101. Further, the PUCCH transmission controller 807 controls the PUCCH generator 810 to generate a PUCCH signal including a scheduling request when the transmission buffer is not empty and includes user data. In other words, the PUCCH generator 810 may generate the PUCCH signal by using the first radio resource.

Further, the PUCCH transmission controller 807 controls the DMRS generator 809 to generate the first reference signal according to the PUCCH resource allocation information output from the control signal demodulator 805 even when the transmission buffer is empty. Consequently, the DMRS generator 809 may output the first reference signal to the channel multiplexer 811 at a cycle at which the PUCCH resource allocator 512 in FIG. 5 has determined an allocation based on the SRS resource allocation information. In other words, the DMRS generator 809 may generate the first reference signal by using the second radio resource even when a PUCCH signal is not generated by using the first radio resource.

The channel multiplexer 811 multiplexes the PUCCH signal generated by the PUCCH generator 810, the first reference signal generated by the DMRS generator 809 and the second reference signal generated by the SRS generator 806, and generates a baseband signal. The channel multiplexer 811 outputs the generated baseband signal to the RF transmitter 812.

The RF transmitter 812 converts the baseband signal generated by the channel multiplexer 811 into an analog signal, up-converts a frequency, generates an uplink signal and outputs the uplink signal to the transmission antenna 813. In addition, the RF transmitter 812 will be also referred to as an "uplink transmitter" or simply as a "transmitter." In other words, the transmitter 812 may generate a PUCCH signal by using the first radio resource. Further, the transmitter 812 may transmit the first reference signal by using the second radio resource even when not transmitting the PUCCH signal by using the first radio resource. Furthermore, the transmitter 812 may transmit the second reference signal by using the third radio resource.

The transmission antenna 813 transmits to the base station 101 a radio signal corresponding to an uplink signal output from the RF transmitter 812.

Figure 9:
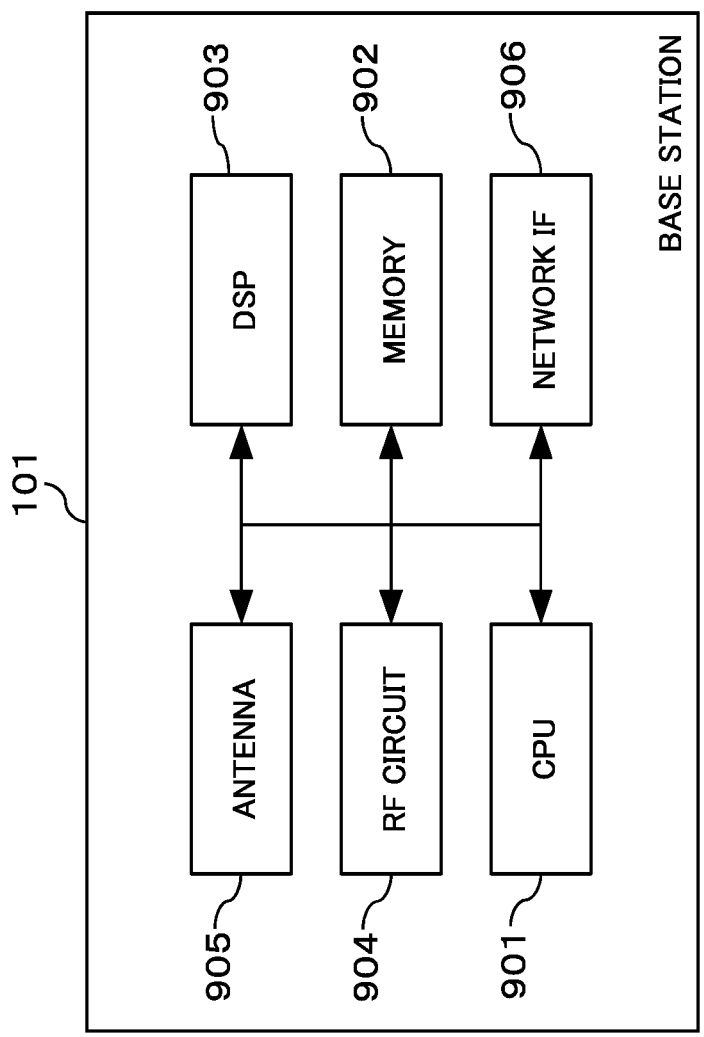
FIG. 9 is a hardware configuration diagram of a base station according to the first embodiment.

FIG. 9 is a hardware configuration diagram of the base station 101. The base station 101 includes a CPU (Central Processing Unit) 901, a memory 902 and a DSP (Digital Processing Unit) 903. Further, the base station 101 includes an RF circuit 904, an antenna 905 and a network IF (InterFace) 906.

The CPU 901 executes a program stored in the memory 902, performs an arithmetic operation and receives an input of digital signals and outputs digital signals to and from the DSP 903 and the network IF 906. Further, part of the memory 902 is used for an arithmetic operation working area. The DSP 903 performs a signal process on the digital signals input to and output from the CPU 901, and analog signals input to and output from the RF circuit 904. The DSP 903 executes a program stored in the memory 902 to perform a signal process. Alternatively, the DSP 903 may be mainly formed of hardware such as an FPGA (Field Programmable Gate Array) or may be formed of hardware alone.

The network IF 906 is an interface which receives an input of digital signals and outputs digital signals from and to the CPU 901, and receives an input of digital signals and outputs digital signals from and to a network such as a core network. Consequently, the base station 101 can communicate with the network such as the core network.

The RF circuit 904 is a circuit which processes uplink signals and downlink signals.

The antenna 905 receives an input of radio signals and outputs radio signals, and performs conversions of uplink signals and downlink signals.

Consequently, in view of the functional block diagram in FIG. 5, the reception antenna 502 and the transmission antenna 516 may correspond to the antenna 905, and the RF receiver 503 and the RF transmitter 515 may correspond to the RF circuit 904. Further, the channel demultiplexer 504, the channel multiplexer 514, the data signal generator 510, the control signal generator 513 and the PUCCH demodulator 505 may correspond to the DSP 903 and the memory 902. Furthermore, the channel estimator 506, the downlink precoding controller 509, the SRS resource allocator 511 and the PUCCH resource allocator 512 may correspond to the CPU 901 and the memory 902.

Figure 10:
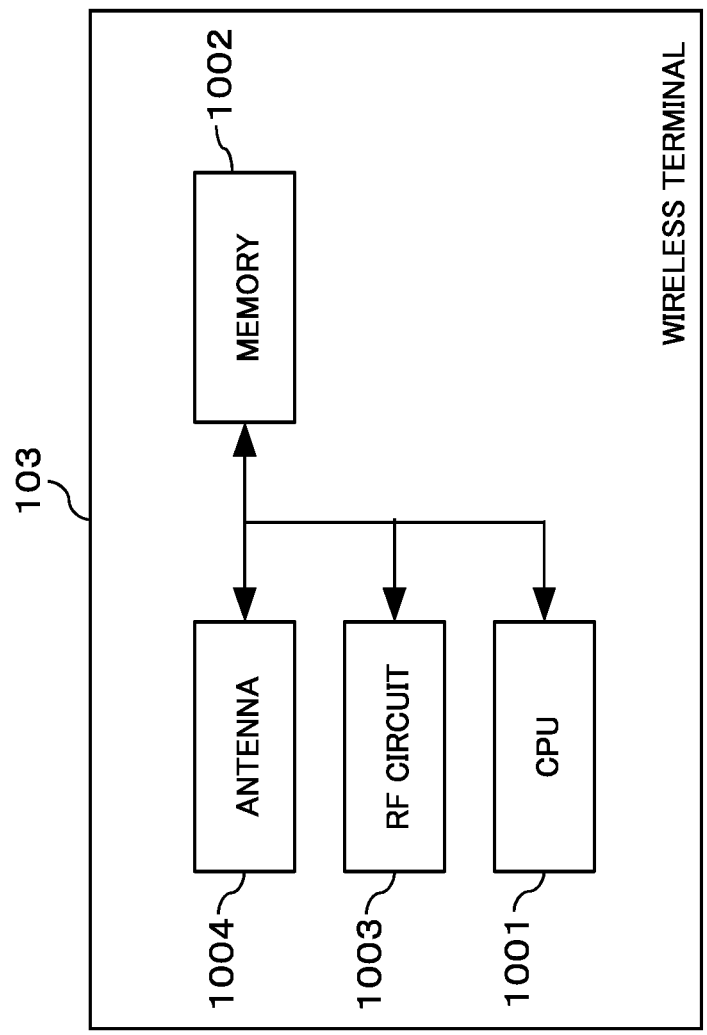
FIG. 10 is a hardware configuration diagram of the wireless terminal according to the first embodiment.

FIG. 10 is a hardware configuration diagram of the wireless terminal 103. The wireless terminal 103 includes a CPU 1001, a memory 1002, an RF circuit 1003 and an antenna 1004.

The CPU 1001 executes a program stored in the memory 1002, performs an arithmetic operation and receives an input of digital signals and outputs digital signals from and to the RF circuit 1003. Further, part of the memory 1002 is used for an arithmetic operation working area. The RF circuit 1003 performs a signal process on digital signals input and output to and from the CPU and analog signals input and output to and from the antenna 1004. The antenna 1004 performs conversions between a radio signal and an uplink and downlink signal, and receives an input of signals and outputs signals from and to the RF circuit 1003.

Hence, in view of the functional block in FIG. 8, the reception antenna 801 and the transmission antenna 813 may correspond to the antenna 1004. Further, the RF receiver 802, the RF transmitter 812, the channel demultiplexer 803 and the channel multiplexer 811 may correspond to the RF circuit 1003. Furthermore, the data signal demodulator 804, the control signal demodulator 805, the SRS generator 806, the DMRS generator 809 and the PUCCH generator 810 may correspond to the RF circuit 1003. The transmission data buffer 808 and the PUCCH transmission controller 807 correspond to the CPU 1001 and the memory 1002.

FIG. 11 is a flowchart for explaining an operation of the base station 101. In step S1101, the SRS resource allocator 511 determines a cycle at which the wireless terminal 103 transmits the second reference signal. In step S1102, the PUCCH resource allocator 512 sets a cycle at which the wireless terminal 103 transmits a PUCCH signal, to the same cycle as a cycle for transmitting a SRS. In step S1103, the SRS resource allocator 511 outputs SRS resource allocation information. In step S1104, the PUCCH resource allocator 512 outputs PUCCH resource allocation information. In step S1105, the control signal generator 513 generates a control signal for allocating a radio resource.

FIG. 12 is a flowchart for explaining an operation of the wireless terminal 103. In step S1201, the PUCCH transmission controller 807 determines whether or not a subframe to be transmitted at a current timing is a PUCCH transmission timing, according to an allocation of a radio resource of a PUCCH. In other words, the PUCCH transmission controller 807 determines whether or not a timing of a current subframe is a subframe allocated as a timing for transmitting a PUCCH signal. When the current timing is the PUCCH transmission timing, the PUCCH transmission controller 807 branches a process to Yes and moves the process to step S1202. When the current timing is not the PUCCH transmission timing, the PUCCH transmission controller 807 branches a process to No, finishes the process of the flowchart in FIG. 12 and waits for a next timing of the process of the flowchart in FIG. 12.

In step S1202, the PUCCH transmission controller 807 obtains from the transmission data buffer 808 information as to whether or not the transmission buffer includes data to be transmitted. The PUCCH transmission controller 807 branches a process to Yes when there is data to be transmitted, and moves the process to step S1203. Further, the PUCCH transmission controller 807 branches a process to No when there is no data to transmit, and moves the process to step S1204.

In step S1203, the PUCCH transmission controller 807 controls the DMRS generator 809 and the PUCCH generator 810 to transmit both of the PUCCH signal and the first reference signal (DMRS). Thus, when there is data to be transmitted, the first reference signal and the PUCCH signal including the scheduling request are transmitted at the same cycle as the cycle for transmitting the second reference signal.

In step S1204, the PUCCH transmission controller 1502 controls the DMRS generator 809 to transmit the first reference signal. Thus, even when there is no data to be transmitted, the first reference signal is transmitted at the same cycle as the cycle for transmitting the second reference signal.

According to the present embodiment, as illustrated in FIG. 13A, the wireless terminal 103 may transmit the PUCCH signal 403 and the first reference signal 701 when, for example, transmitting a scheduling request. Further, as illustrated in FIG. 13B, the wireless terminal 103 may transmit the first reference signal 701 at a time and a frequency specified by a radio resource for transmitting a PUCCH signal even when, for example, not transmitting a scheduling request. Consequently, the wireless terminal 103 may associate the cycle for transmitting the first reference signal 701, with the cycle for transmitting the second reference signal 405, and set the cycles to the same cycle.

Consequently, it is possible to estimate a channel state of a frequency band of a PUCCH which is a frequency band of the radio link outside the frequency band of the second reference signal 405. Thereby, it is possible to more accurately estimate a channel state by additionally estimating a channel state based on the second reference signal 405.

In addition, when the wireless terminal 103 does not transmit a PUCCH signal, the wireless terminal 103 transmits the first reference signal 701 so that the base station 101 may more accurately estimate a channel state of an uplink frequency band. Hence, frequency bandwidths of the second reference signal 405 may be extended to uplink frequency bandwidths 1201 and 1202 in FIG. 13C. In other words, the second reference signal 405 may be also used as the first reference signal 701. Meanwhile, in FIGS. 13A and 13B, the frequency resource of the second reference signal 405 and the frequency resource of the first reference signal 701 are different.

In addition, when the extension is performed, the first reference signal 701 does not need to be transmitted. In this case, the frequency resources 1201 and 1202 need to be allocated to the wireless terminal 103. In other words, when the wireless terminal 103 does not have a PUCCH signal to be transmitted and when the frequency resources 1201 and 1202 are allocated to the wireless terminal 103 to transmit the second reference signal, a frequency bandwidth of the second reference signal 405 may be extended.

Figure 14:
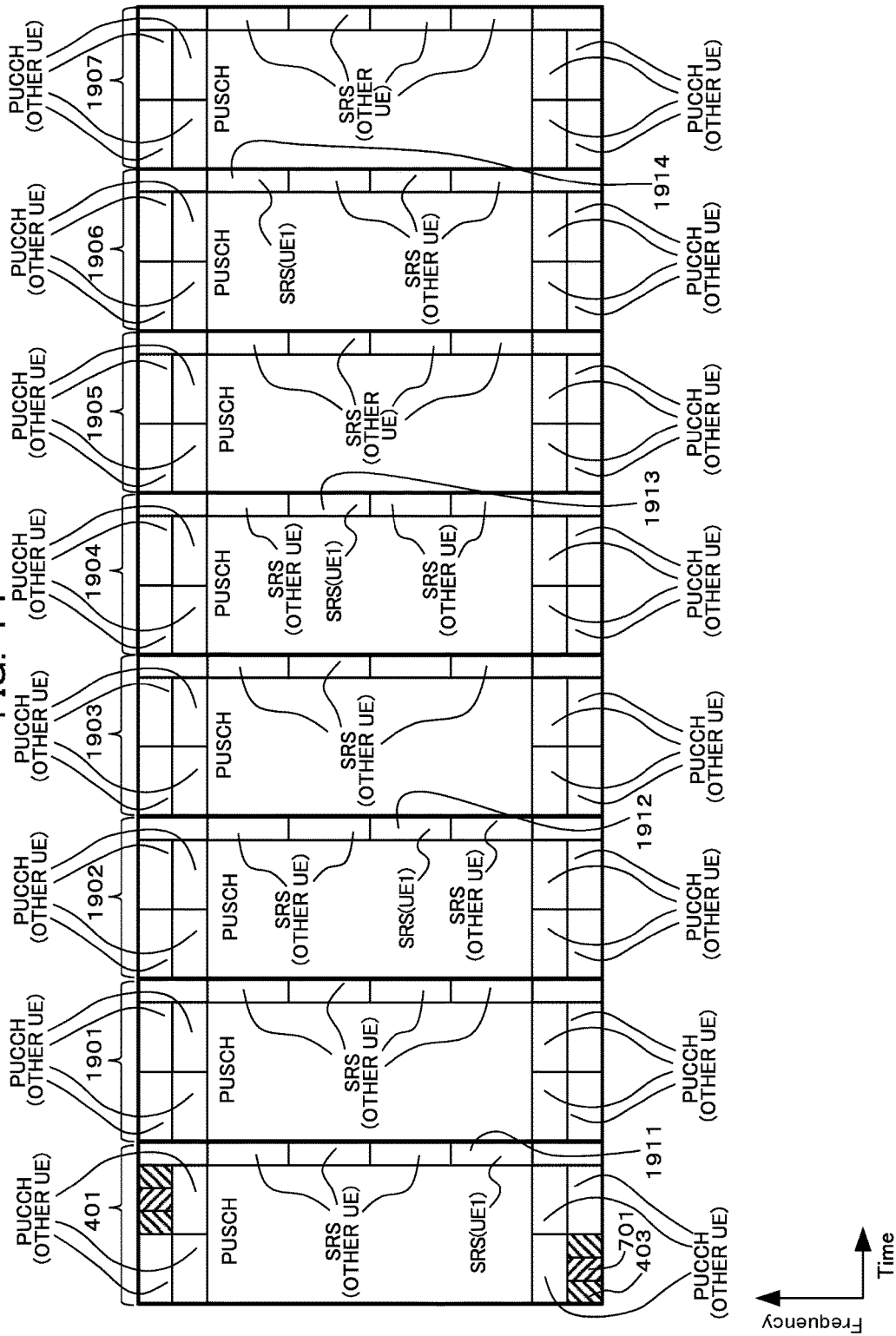
FIG. 14 is a view illustrating an example where radio resources of the uplink channel are allocated to the wireless terminal according to the first embodiment.

In addition, a frequency band of the second reference signal may be divided into a plurality of frequency bands to be transmitted by using a plurality of subframes. In other words, as illustrated in FIG. 14, the second reference signal may be divided into frequency bands 1911, 1912, 1913 and 1914. Further, as illustrated in FIG. 14, subframes 401 to 1907 may continue and frequency bands 1911, 1912, 1913 and 1914 may be distributed to the subframes 401, 1902, 1904 and 1906 to transmit. This transmission may be performed when transmission power of the wireless terminal 103 is limited.

During this transmission, even when the second reference signal is transmitted by using a plurality of subframes, the wireless terminal 103 transmits the PUCCH signal 403 by using the subframe 401 and transmits the first reference signal 701. A plurality of subframes 401, 1902, 1904 and 1906 may be regarded as one subframe group. In other words, the wireless terminal 103 may associate a transmission cycle of a subframe group for transmitting the second reference signal, with a cycle for transmitting a PUCCH signal. Consequently, it is possible to support the first embodiment even when transmission power of the wireless terminal 103 is limited.

As described above, according to the first embodiment, it is possible to allocate to a wireless terminal a radio resource whose cycle for transmitting the second cycle and cycle for transmitting a PUCCH signal are the same. Consequently, it is possible to more accurately estimate a channel state of the uplink frequency band.

(Second Embodiment)

Figure 15:
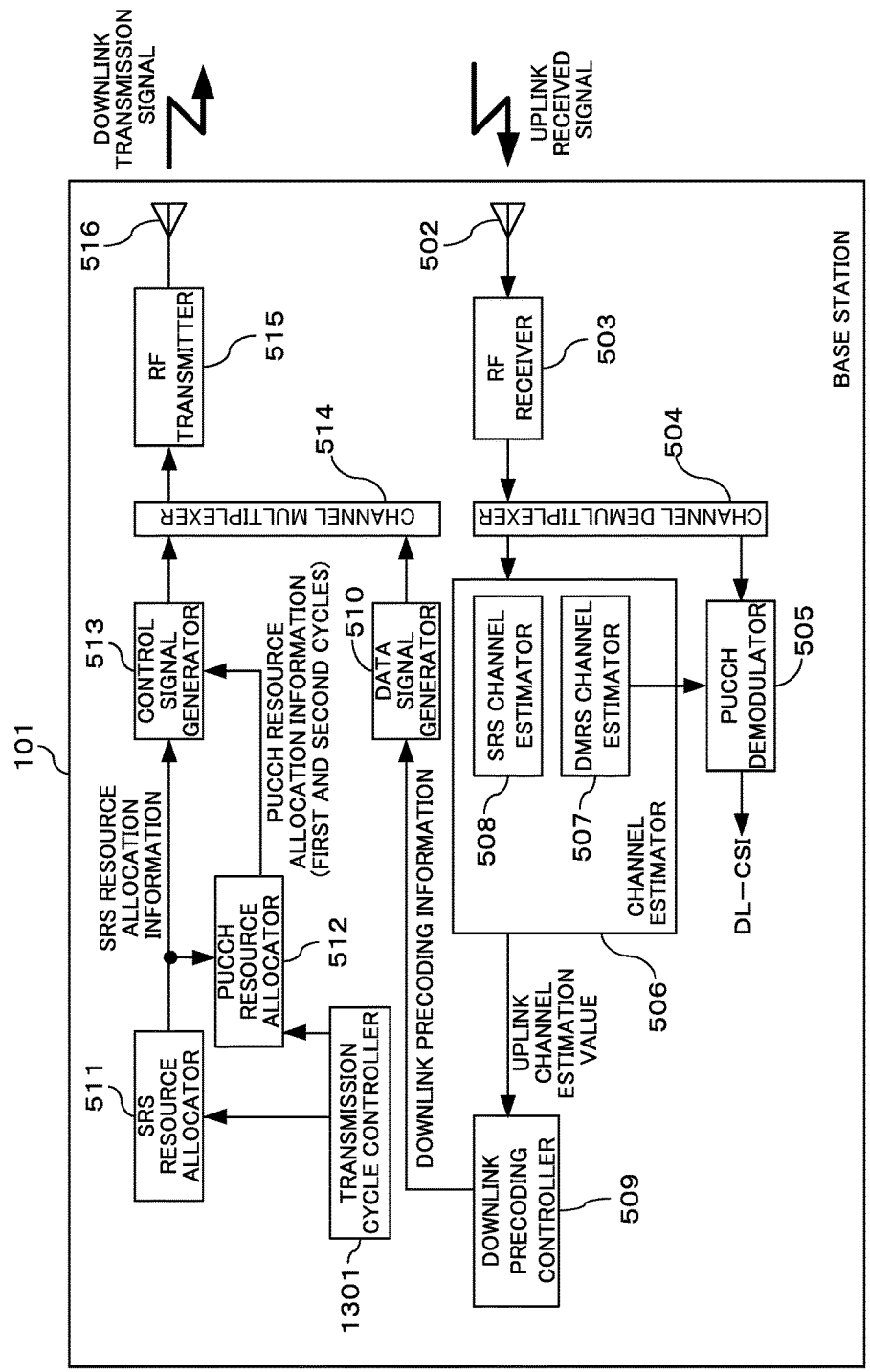
FIG. 15 is a functional block diagram of a base station according to a second embodiment.

FIG. 15 is a functional block diagram of a base station 101 according to a second embodiment. The base station 101 includes a reception antenna 502, an RF receiver 503, a channel demultiplexer 504, a PUCCH demodulator 505, a channel estimator 506 and a downlink precoding controller 509. Further, the base station 101 includes a data signal generator 510, a transmission cycle controller 1301, an SRS resource allocator 511, a PUCCH resource allocator 512, a control signal generator 513, a channel multiplexer 514, an RF transmitter 515 and a transmission antenna 516.

One of differences from the base station 101 according to the first embodiment illustrated in FIG. 5 is that the base station 101 according to the present embodiment includes the transmission cycle controller 1301. In the present embodiment, the transmission cycle controller 1301, the SRS resource allocator 511 and the PUCCH resource allocator 512 will be also referred to as a "scheduler" collectively.

The transmission cycle controller 1301 first determines a cycle (first cycle) at which a wireless terminal 103 transmits a second reference signal. Next, the transmission cycle controller 1301 determines the cycle at which the wireless terminal transmits a first reference signal. Further, the transmission cycle controller 1301 determines a cycle (second cycle) at which the wireless terminal 103 transmits a PUCCH signal and is a multiple of the cycle at which the wireless terminal 103 transmits the second reference signal while the multiple is larger than one. More specifically, the transmission cycle controller 1301 may determine the cycle at which the wireless terminal transmits the PUCCH signal is an integer multiple of the cycle at which the wireless terminal 103 transmits the second reference signal while the integer multiple is two or more.

For example, the transmission cycle controller 1301 determines transmission of the second reference signal by using subframes #0, #2, #4, #6, #8, #10 and . . . having numbers which are multiples of two. Further, the transmission cycle controller 1301 determines transmission of the first reference signal by using subframes #0, #2, #4, #6, #8, #10 and . . . having the numbers which are multiples of two. Next, the transmission cycle controller 1301 determines a cycle at which the PUCCH signal is transmitted and is twice as the cycle for transmitting the second reference signal. In this case, the PUCCH signal is transmitted by using the subframes #0, #4 and #8 and . . . having numbers which are multiples of four.

In addition, subframes used by the wireless terminal 103 to transmit the second reference signal do not need to come at equal intervals, and therefore subframes used to transmit the first reference signal do not need to come at equal intervals, either.

Further, the transmission cycle controller 1301 may also determine to transmit the PUCCH signal at the same cycle as the cycle at which the wireless terminal 103 transmits the second reference signal. In this case, radio resources allocated from the base station 101 to the wireless terminal 103 may be the same as radio resources according to the first embodiment.

The SRS resource allocator 511 generates SRS resource allocation information according to the determination of the transmission cycle controller 1301, and outputs the SRS resource allocation information to the control signal generator 513. Further, the PUCCH resource allocator 512 generates PUCCH resource allocation information including first and second cycles, and outputs the PUCCH resource allocation information to the control signal generator 513. The control signal generator 513 generates a signal for allocating a radio resource to the wireless terminal 103 according to the SRS resource allocation information and the PUCCH resource allocation information, and outputs the signal to the channel multiplexer 514.

The allocation of the radio resource is useful when the wireless terminal 103 includes in an uplink control channel signal a signal indicating a CSI report obtained by estimating a downlink state. In other words, the PUCCH resource allocator 512 may allocate a frequency resource for a PUCCH format 2 to a subframe for transmitting the second reference signal. In case of time-division multiplex in particular, it is possible to estimate a channel state based on the first reference signal and the second reference signal, and therefore usefulness of the CSI report is not so high, the CSI report does not need to be transmitted frequently, and a transmission frequency of the CSI report lowers. Meanwhile, it is possible to increase a transmission frequency of the second reference signal and the first reference signal compared to the transmission frequency of the CSI report. Consequently, the base station 101 can perform uplink channel estimation at a certain frequency or more.

In the second embodiment, as illustrated in FIG. 15, the PUCCH demodulator 505 can demodulate and output DL (Down Link)-CSI.

Figure 16:
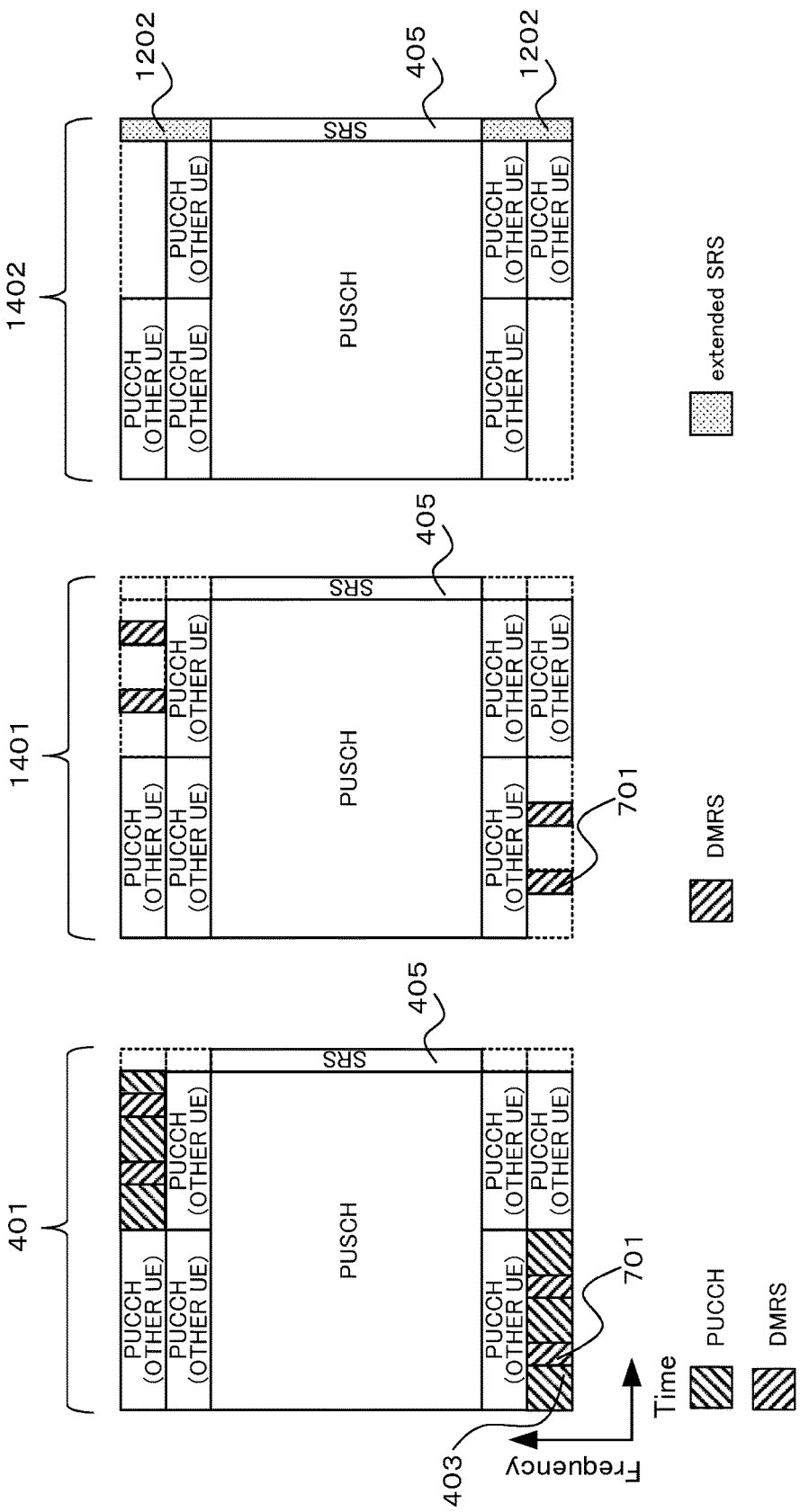
FIG. 16A is a view illustrating an example where radio resources (a first radio resource and a third radio resource) of an uplink channel are allocated to a wireless terminal according to the second embodiment.
FIG. 16B is a view illustrating an example where radio resources (a second radio resource and the third radio resource) of the uplink channel are allocated to the wireless terminal according to the second embodiment.
FIG. 16C is a view illustrating an example where a radio resource (a fourth radio resource) of the uplink channel is allocated to the wireless terminal according to the second embodiment.

FIG. 16A is a view illustrating an example of radio resources allocated to the wireless terminal 103 by using subframes of the second cycle. The wireless terminal 103 can arrange a PUCCH signal 403 and the first reference signal 701 in a subframe 401 of the second cycle, and transmit a second reference signal 405.

FIG. 16B is a view illustrating an example of radio resources of a subframe of the first cycle allocated to the wireless terminal 103. The wireless terminal 103 can arrange the first reference signal 701 in a subframe 1401 of the first cycle, and transmit the second reference signal 405.

The length of the first cycle is shorter than the length of the second cycle; therefore, the subframe 1401 is more frequently transmitted from the wireless terminal 103 to the base station 101 than the subframe 401. In the second cycle, the PUCCH signal is not included, so that consumption power of the wireless terminal 103 can be reduced compared to a case where the PUCCH signal is transmitted at the second cycle.

In addition, as illustrated as an example in FIG. 16C, with regard to the wireless terminal 103, a frequency band of the second reference signal 405 of the subframe of the first cycle may be extended to uplink frequency bands 1201 and 1202. When the extension is performed, the first reference signal 701 does not need to be transmitted. In other words, the second reference signal 405 is also used as the first reference signal 701. Meanwhile, in FIGS. 16A and 16B, the frequency resource of the second reference signal 405 and a frequency resource of the first reference signal 701 are different.

Figure 17:
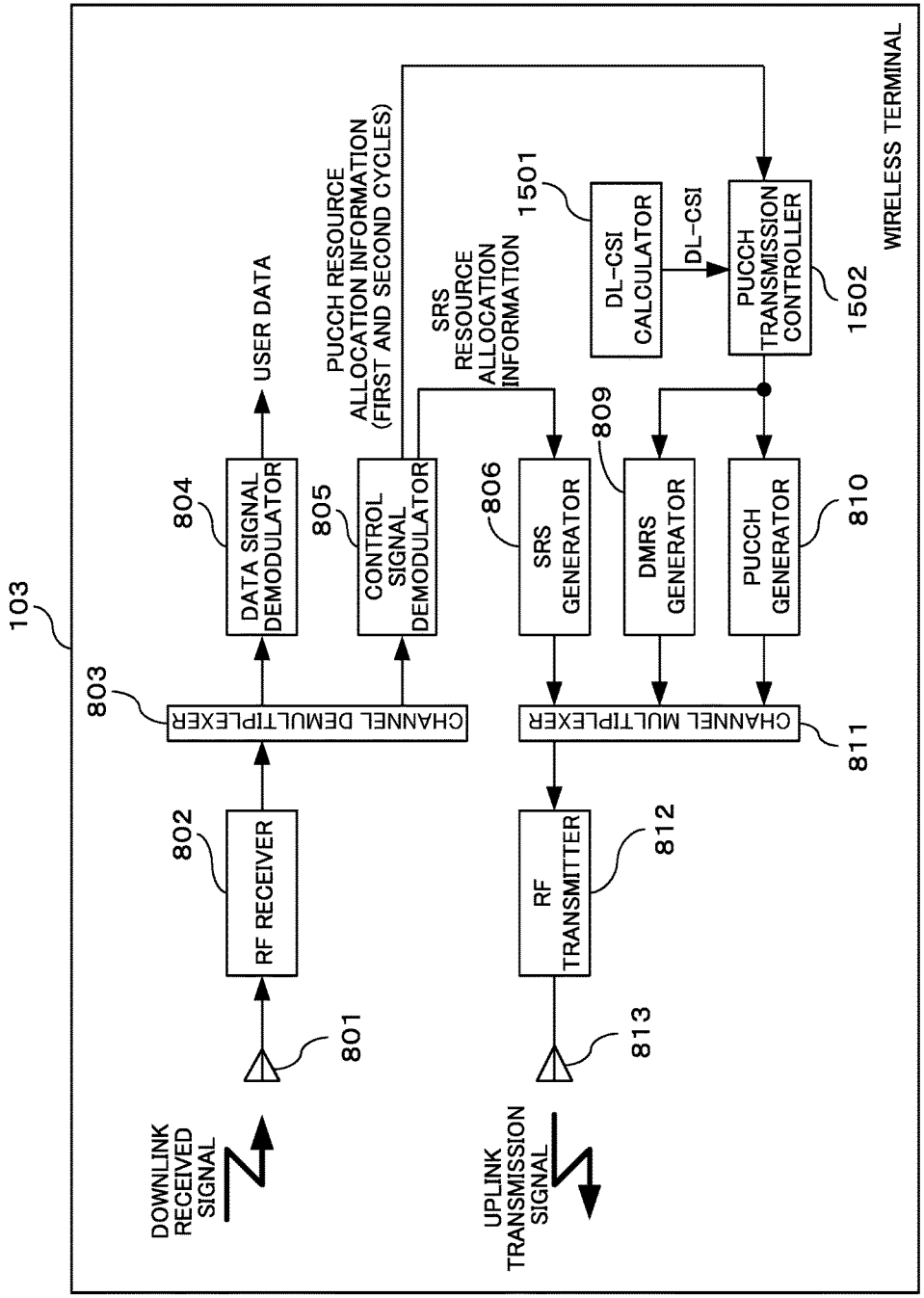
FIG. 17 is a functional block diagram of the wireless terminal according to the second embodiment.

FIG. 17 is a functional block of the wireless terminal 103 according to the second embodiment. The wireless terminal 103 includes a reception antenna 801, an RF receiver 802, a channel demultiplexer 803, a data signal demodulator 804, a control signal demodulator 805 and an SRS generator 806. Further, the wireless terminal 103 includes a DL-CSI (Down Link Channel State Information) calculator 1501 and a PUCCH transmission controller 1502. Furthermore, the wireless terminal 103 includes a DMRS generator 809, a PUCCH generator 810, a channel multiplexer 811, an RF transmitter 812 and a transmission antenna 813.

One of differences from the functional block diagram of the wireless terminal 103 illustrated in FIG. 8 according to the first embodiment is that, in the present embodiment, for example, the wireless terminal 103 includes the DL-CSI calculator 1501 and the PUCCH transmission controller 1502.

The DL-CSI calculator 1501 calculates downlink channel state information (DL-CSI). The calculated downlink channel state information is output to the PUCCH transmission controller 1502. The PUCCH transmission controller 1502 transmits the downlink channel state information by using a subframe which is generated in the second cycle of the PUCCH resource allocation information output from the DLI-CSI calculator 1502. Hence, the PUCCH transmission controller 1502 may cause the PUCCH generator 810 to generate a PUCCH signal including downlink channel state information at the second cycle. Further, the PUCCH transmission controller 1502 may cause the DMRS generator 809 to generate the first reference signal for the subframes produced at the first cycle. Thus, the wireless terminal 103 transmits the signal including the downlink channel state information and the first reference signal to the base station 101 at the second cycle. Further, the wireless terminal 103 transmits the second reference signal and the first reference signal to the base station 101 at the first cycle.

Figure 18:
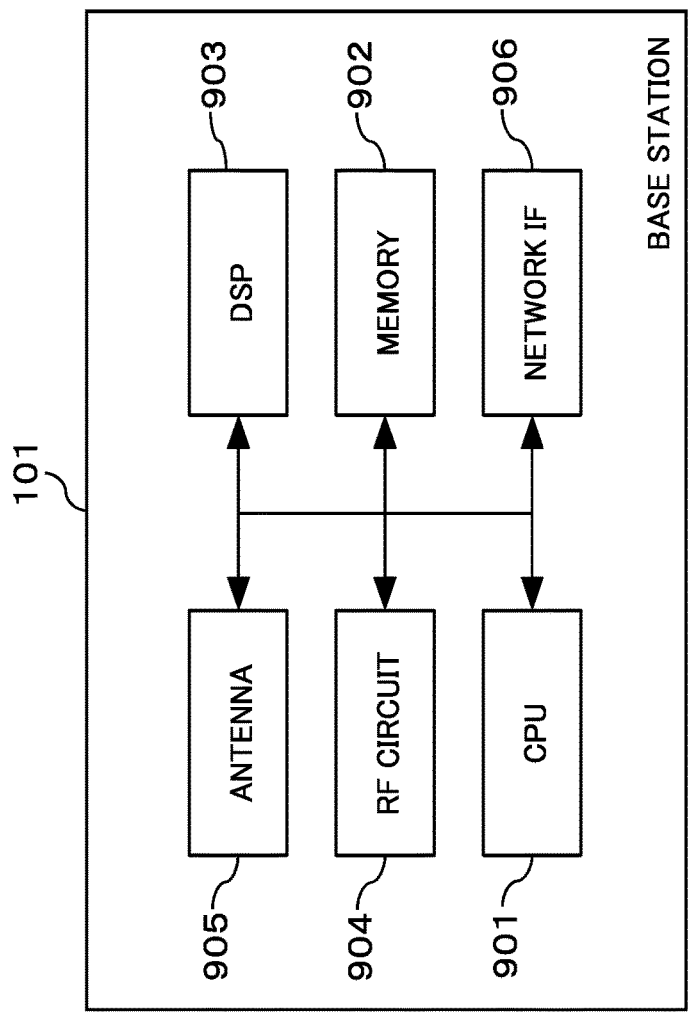
FIG. 18 is a hardware configuration diagram of a base station according to the second embodiment.

FIG. 18 is a hardware configuration diagram of the base station 101 according to the second embodiment. The base station 101 includes a CPU 901, a memory 902 and a DSP 903. Further, the base station 101 includes an RF circuit 904, an antenna 905 and a network IF 906.

Hence, in view of the functional block diagram of FIG. 15, the antenna 502 and the transmission antenna 516 may correspond to the antenna 905, and the RF receiver 503 and the RF transmitter 515 may correspond to the RF circuit 904. Further, the channel demultiplexer 504, the channel multiplexer 514, the data signal generator 510 and the control signal generator 513 may correspond to the DSP 903 and the memory 902. Furthermore, the PUCCH demodulator 505, the channel estimator 506, the downlink precoding controller 509, the SRS resource allocator 511, the PUCCH resource allocator 512 and the transmission cycle controller 1301 may correspond to the CPU 901 and the memory 902.

Figure 19:
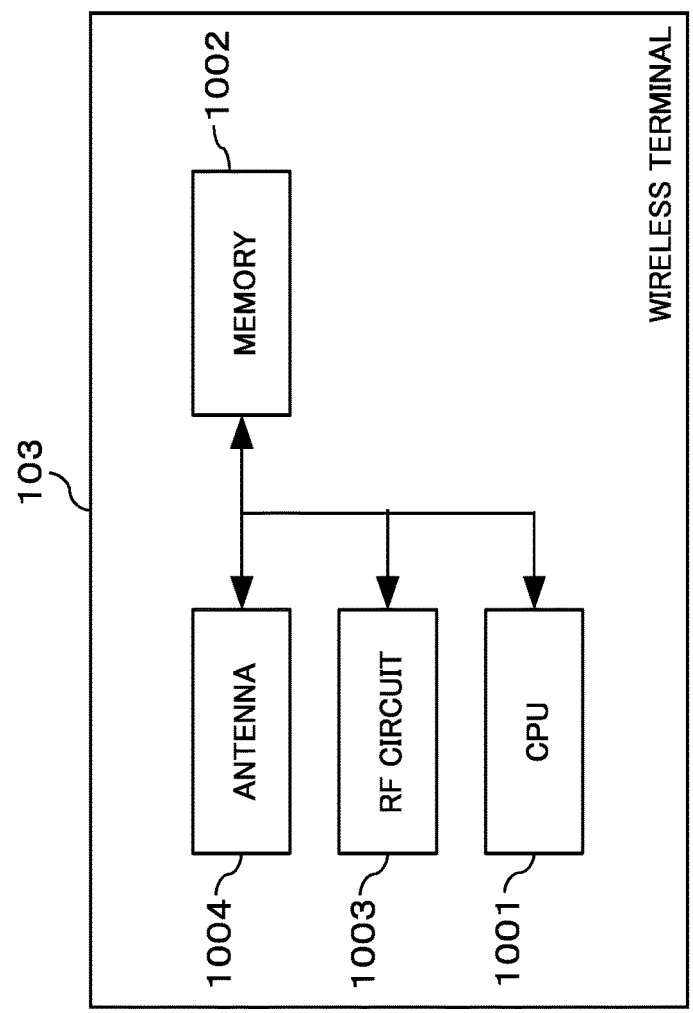
FIG. 19 is a hardware configuration diagram of the wireless terminal according to the second embodiment.

FIG. 19 is a hardware configuration diagram of the wireless terminal 103 according to the second embodiment. The wireless terminal 103 includes a CPU 1001, a memory 1002, an RF circuit 1003 and an antenna 1004.

Hence, in view of the functional block in FIG. 17, the reception antenna 801 and the transmission antenna 813 may correspond to the antenna 905. Further, the RF receiver 802, the RF transmitter 812, the channel demultiplexer 803, the data signal demodulator 804, the control signal demodulator 805, the SRS generator 806, the DMRS generator 809 and the PUCCH generator 810 may correspond to the RF circuit 1003. The DL-CSI calculator 1501 and the PUCCH transmission controller 1502 may correspond to the CPU 1001 and the memory 1002.

Figure 20:
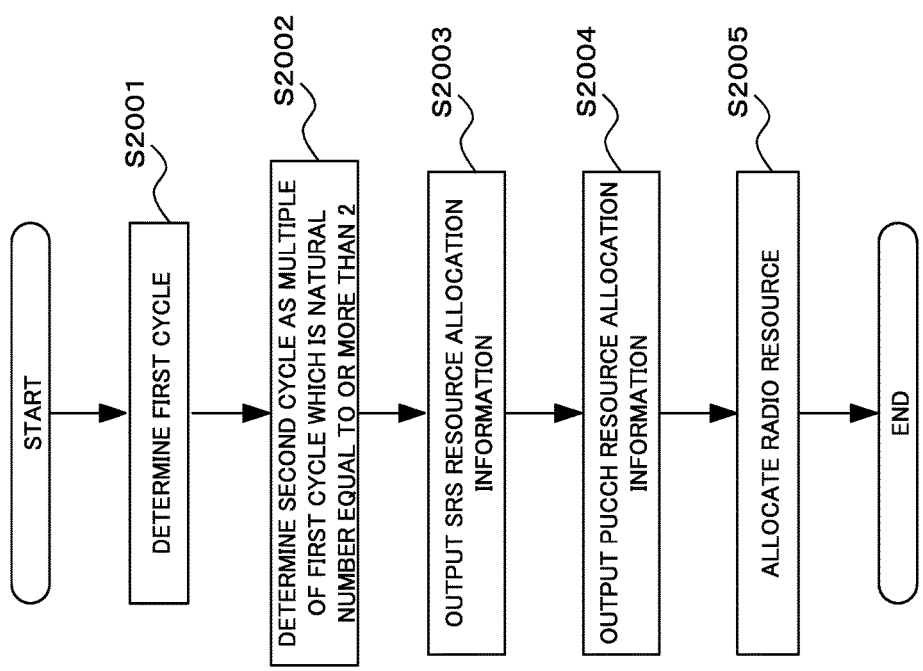
FIG. 20 is a flowchart for explaining an operation of the base station according to the second embodiment.

FIG. 20 is a flowchart for explaining an operation of the base station 101. In step S2001, the transmission cycle controller 1301 determines the first cycle. In step S2002, the transmission cycle controller 1301 determines the length of the second cycle as a cycle which is a multiple of the length of the first cycle larger than one. More specifically, the transmission cycle controller 1301 may determine the second cycle as a cycle which is a multiple of the second cycle which is a natural number equal to or more than two. In step S2003, the SRS resource allocator 511 outputs the SRS resource allocation information to the control signal generator 513. In step S2004, the PUCCH resource allocator 512 outputs the PUCCH resource allocation information to the control signal generator 513. In step S2005, the control signal generator 513 generates a control signal for allocating radio resources to the wireless terminal 103 based on the SRS resource allocation information and the PUCCH resource allocation information.

Figure 21:
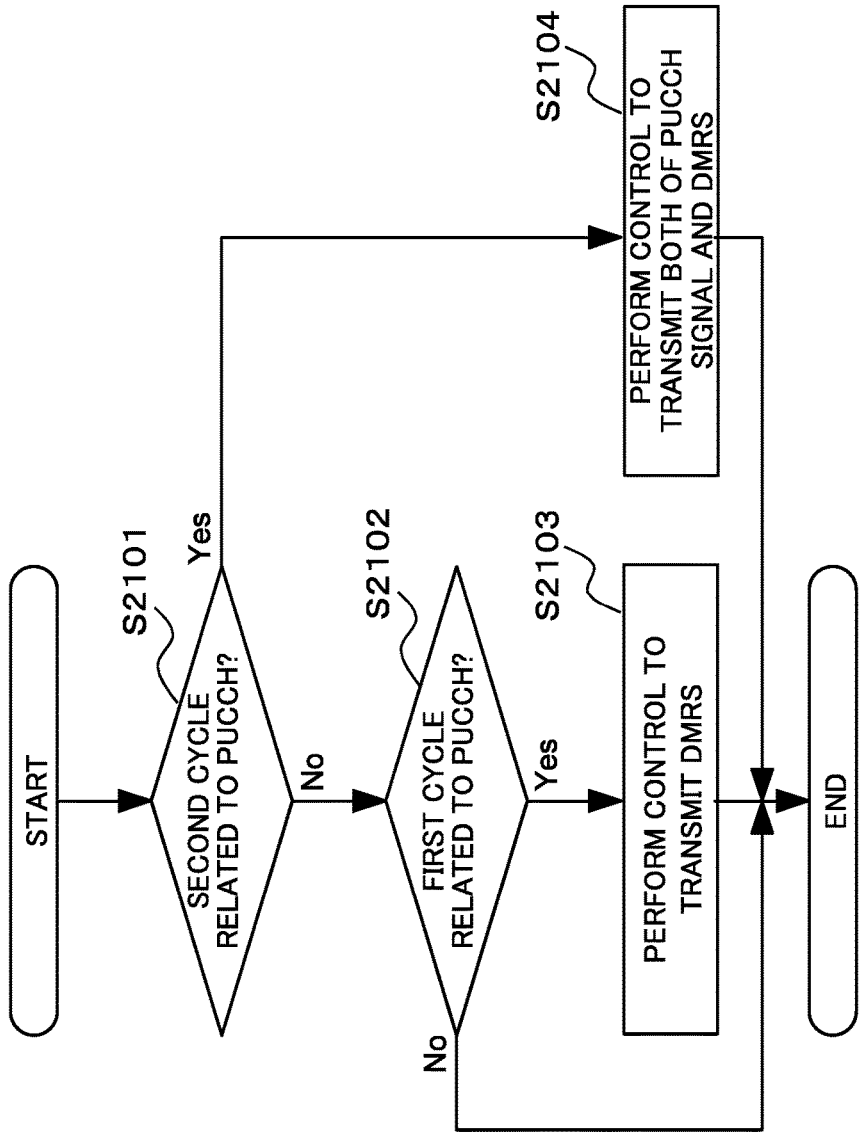
FIG. 21 is a flowchart for explaining an operation of the wireless terminal according to the second embodiment.

FIG. 21 is a flowchart for explaining an operation of the wireless terminal 103. In step S2101, the PUCCH transmission controller 1502 determines whether a current timing is the second cycle related to a PUCCH, according to the PUCCH resource allocation information. In other words, the PUCCH transmission controller 1502 determines whether or not a current subframe is a subframe to be transmitted at the second cycle. When the current subframe is the subframe to be transmitted at the second cycle, the PUCCH transmission controller 1502 moves the process to Yes. When the current timing does not correspond to the first cycle, the PUCCH transmission controller 1502 moves the process to No.

When the PUCCH transmission controller 1502 branches the process to Yes in step S2101, the PUCCH transmission controller 1502 moves the process to step S2104 and controls the DMRS generator 809 and the PUCCH generator 810 to transmit both of the PUCCH signal and the first reference signal. Subsequently, the PUCCH transmission controller 1502 finishes the process of the flowchart in FIG. 21.

When the PUCCH transmission controller 1502 moves the process to No in step S2101, the PUCCH transmission controller 1502 moves the process to step S2102 and determines whether or not a current timing is the first cycle related to a PUCCH. In other words, the PUCCH transmission controller 1502 determines whether or not a current subframe is a subframe to be transmitted at the first cycle. When the current subframe is transmitted at the first cycle, the PUCCH transmission controller 1502 moves the process to Yes, and moves the process to step S2103. Further, when the current timing does correspond to the first cycle, the PUCCH transmission controller 1502 branches the process to No, and finishes the process of the flowchart in FIG. 21.

In step S2103, the PUCCH transmission controller 1502 controls the DMRS generator 809 to transmit only the first reference signal among the PUCCH signal and the first reference signal. Subsequently, the PUCCH transmission controller 1502 finishes the process of the flowchart in FIG. 21.

As described above, according to the second embodiment, the wireless terminal 103 can transmit the first reference signal and the second reference signal at a cycle shorter than the length of the second cycle for transmitting a CSI report. Thus, the first reference signal and the second reference signal are more frequently transmitted to the base station 101 than the CSI report. Consequently, the base station 101 can more accurately estimate a channel state of an uplink frequency band. This is because, when, for example, different frequency bands between uplink and downlink are used, a CSI report makes it difficult to accurately estimate an uplink channel state. Further, even when the same frequency band is used in uplink and downlink, a frequency bandwidth which can be estimated is not the same as a frequency bandwidth of an uplink channel due to the CSI in some cases.

According to one aspect, it is possible to more accurately estimate a channel state of a radio link.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A base station comprising a scheduler that allocates a first radio resource, a second radio resource, and a third radio resource,the first radio resource being used to transmit a control channel signal from a wireless terminal, the second radio resource being used to transmit from the wireless terminal a first reference signal corresponding to the control channel signal even when the wireless terminal does not transmit the control channel signal by using the first radio resource, and the third radio resource being used to transmit from the wireless terminal a second reference signal corresponding to a data channel signal.

2. The base station according to claim 1, wherein the scheduler is configured to allocate the first radio resource and the third radio resource such that a length of a first cycle is one time or more as a length of a second cycle, the first cycle being a cycle at which the wireless terminal transmits the control channel signal, and the second cycle being a cycle at which the wireless terminal transmits the second reference signal.

3. The base station according to claim 2, wherein a frequency resource of the first reference signal is different from a frequency resource of the second reference signal.

4. The base station according to claim 2, wherein the second reference signal is used as the first reference signal.

5. The base station according to claim 2, wherein the scheduler allocates the first radio resource and the third radio resource such that the length of the first cycle and the length of the second cycle are identical.

6. The base station according to claim 5, wherein the scheduler allocates the third radio resource such that the length of the second cycle is as same as a length of a third cycle, the second cycle being the cycle at which the wireless terminal transmits the second reference signal, the third cycle being a cycle at which a subframe group is transmitted, and the second reference signal being divided into a plurality of frequency bands and being transmitted by the wireless terminal by using each of a plurality of subframes of the subframe group.

7. The base station according to claim 5, wherein the scheduler allocates the first radio resource and the third radio resource such that the wireless terminal transmits the second reference signal and the control channel signal by using an identical subframe.

8. The base station according to claim 2, wherein the scheduler allocates the first radio resource, the second radio resource and the third radio resource such that the wireless terminal transmits the first reference signal at a fourth cycle, and the length of the second cycle is as same as a length of the fourth cycle, and the length of the first cycle being a multiple of the length of the second cycle larger than one.

9. A wireless terminal comprising a transmitter that transmits a first reference signal by using a second radio resource and transmits a second reference lanai by using a third radio resource, the second radio resource being used to transmit the first reference signal corresponding to a control channel signal even when the control channel signal is not transmitted by using a first radio resource used to transmit the control channel signal, and the third radio resource being used to transmit the second reference signal corresponding to a data channel signal.

10. The wireless terminal according to claim 9, wherein the transmitter transmits the second reference signal to a base station at a second cycle, a length of the second cycle being one time or more as a length of a first cycle at which the transmitter transmits the control channel signal to the base station.

11. The wireless terminal according to claim 10, wherein the first reference signal is transmitted in a frequency band different from the second reference signal.

12. The wireless terminal according to claim 10, wherein the second reference signal is used as the first reference signal.

13. The wireless terminal according to claim 10, wherein the length of the second cycle is set to identical to the length of the first cycle.

14. The wireless terminal according to claim 13, wherein the length of the second cycle is as same as a length of a third cycle, the third cycle being a cycle for transmitting a subframe group, and the second reference signal being divided into a plurality of frequency bands and being transmitted by using a plurality of subframes of the subframe group.

15. The wireless terminal according to claim 13, wherein the second reference signal and the control channel signal are transmitted by using an identical frame.

16. The wireless terminal according to claim 10, wherein the first reference signal is transmitted at a fourth cycle, a length of the fourth cycle being as same as the length of the second cycle, and the length of the first cycle being a multiple of the length of the second cycle larger than one.

17. A wireless communication system comprising:
   a base station; and
   a wireless terminal that communicates with the base station, wherein
   the base station includes a scheduler that allocates a first radio resource, a second radio resource, and a third radio resource, the first radio resource being used to transmit a control channel signal from a wireless terminal, the second radio resource being used to transmit from the wireless terminal a first reference signal corresponding to the control channel signal even when the wireless terminal does not transmit the control channel signal by using the first radio resource, and the third radio resource being used to transmit from the wireless terminal a second reference signal corresponding to a data channel signal, and
   the wireless terminal includes a transmitter that transmits a first reference signal by using a second radio resource even when the control channel signal is not transmitted by using a first radio resource allocated by the base station, and transmits a second reference signal by using a third radio resource.

* * * * *